US012806839B2

(12) United States Patent
Shimada et al.

(10) Patent No.: US 12,806,839 B2
(45) Date of Patent: Nov. 24, 2026

(54) INJECTION MOLDING SUPPORT SYSTEM AND METHOD

(71) Applicant: Hitachi, Ltd., Tokyo (JP)

(72) Inventors: Ryotaro Shimada, Tokyo (JP); Satoshi Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 18/024,936

(22) PCT Filed: Oct. 4, 2021

(86) PCT No.: PCT/JP2021/036690
§ 371 (c)(1),
(2) Date: Mar. 6, 2023

(87) PCT Pub. No.: WO2022/085416
PCT Pub. Date: Apr. 28, 2022

(65) Prior Publication Data

US 2023/0373145 A1 Nov. 23, 2023

(30) Foreign Application Priority Data

Oct. 19, 2020 (JP) ................................ 2020-175580

(51) Int. Cl.
*B29C 45/76* (2006.01)

(52) U.S. Cl.
CPC .. *B29C 45/766* (2013.01); *B29C 2945/76006* (2013.01); *B29C 2945/7604* (2013.01);
(Continued)

(58) Field of Classification Search
CPC ........ B29C 45/766; B29C 2945/76006; B29C 2945/7604; B29C 2945/76056;
(Continued)

(56) References Cited

U.S. PATENT DOCUMENTS 3,446,889 A * 5/1969 Draudt ................ B29C 45/2803 264/328.13
5,035,598 A * 7/1991 Fujita .................... B29C 45/766 425/149

(Continued)

FOREIGN PATENT DOCUMENTS

CN 102264526 A 11/2011
CN 103914581 A 7/2014

(Continued)

OTHER PUBLICATIONS

Machine Translation for JP-2004009305-A, obtained Jun. 2025 (Year: 2025).*

(Continued)

*Primary Examiner* — Christopher E. Everett
*Assistant Examiner* — Vi N Tran
(74) *Attorney, Agent, or Firm* — Procopio, Cory, Hargreaves & Savitch LLP

(57) ABSTRACT

Provided is an injection molding support system and method that can support searching for suitable materials. This injection molding support system 1 comprises: a process 35 of acquiring a production result using a combination of a mold and a predetermined material and material information on a predetermined material; a process 36 of acquiring the production result, the material information on a predetermined material, and material information on a plurality of previously acquired materials, and selecting at least one candidate material from among the plurality of materials on the basis of the acquired information; a process 43 of creating a correction molding condition for injection molding using a combination of the selected candidate material and the mold; and a process 34 of providing, to a user, the created correction molding condition and the output candidate material.

20 Claims, 10 Drawing Sheets

(52) U.S. Cl.
CPC ............... *B29C 2945/76056* (2013.01); *B29C 2945/7611* (2013.01); *B29C 2945/76254* (2013.01); *B29C 2945/76434* (2013.01); *B29C 2945/76498* (2013.01); *B29C 2945/76531* (2013.01); *B29C 2945/76765* (2013.01)

(58) Field of Classification Search
CPC ... B29C 2945/7611; B29C 2945/76254; B29C 2945/76434; B29C 2945/76498; B29C 2945/76531; B29C 2945/76765; B29C 2945/7621; B29C 2945/76214; B29C 2945/76327; B29C 2945/76381; B29C 2945/76418
USPC .......................................................... 700/197
See application file for complete search history.

(56) References Cited

U.S. PATENT DOCUMENTS

| | | | | |
|---|---|---|---|---|
| 8,168,097 | B2 * | 5/2012 | Hakoda | B29C 45/77 425/149 |
| 2006/0076712 | A1 * | 4/2006 | Yonemochi | B29C 37/0028 264/328.8 |
| 2008/0102147 | A1 | 5/2008 | Shioiri et al. | |
| 2009/0053546 | A1 * | 2/2009 | Di Domenico | B22D 17/32 428/544 |
| 2012/0024709 | A1 * | 2/2012 | Sung | C25D 1/10 205/70 |
| 2013/0103184 | A1 | 4/2013 | Morikawa et al. | |
| 2013/0255371 | A1 | 10/2013 | Beaumont et al. | |
| 2015/0197054 | A1 * | 7/2015 | White | B29C 45/77 425/149 |
| 2016/0121532 | A1 | 5/2016 | Kraibühler et al. | |
| 2016/0236392 | A1 * | 8/2016 | Aoyama | B29C 45/768 |
| 2017/0050361 | A1 * | 2/2017 | Kato | B29C 45/76 |
| 2019/0389111 | A1 * | 12/2019 | Stiefel | B29C 45/77 |
| 2020/0094461 | A1 * | 3/2020 | Okubo | G05B 13/0265 |
| 2020/0115546 | A1 * | 4/2020 | Hara | B29B 9/14 |
| 2020/0198201 | A1 * | 6/2020 | Shimokusuzono | B29C 45/766 |
| 2020/0254670 | A1 * | 8/2020 | Horiuchi | G06N 3/08 |
| 2020/0293011 | A1 * | 9/2020 | Kanaya | G05B 13/048 |
| 2020/0307053 | A1 | 10/2020 | Shimada et al. | |
| 2020/0391414 | A1 * | 12/2020 | Ozeki | B29C 33/3835 |
| 2022/0080646 | A1 * | 3/2022 | Tomiyama | B29C 48/92 |

FOREIGN PATENT DOCUMENTS

| | | | | | |
|---|---|---|---|---|---|
| CN | 111745924 | A | | 10/2020 | |
| JP | H03-284922 | A | | 12/1991 | |
| JP | H06320588 | A | * | 11/1994 | |
| JP | H08311503 | A | * | 11/1996 | |
| JP | H10138308 | A | * | 5/1998 | |
| JP | 2004009305 | A | * | 1/2004 | |
| JP | 2004182957 | A | * | 7/2004 | |
| JP | 2008-110486 | A | | 5/2008 | |
| JP | 2008195023 | A | * | 8/2008 | |
| JP | 4167282 | B | | 10/2008 | |
| JP | 2009137073 | A | * | 6/2009 | |
| JP | 4786186 | B2 | * | 10/2011 | |
| JP | 2012-011660 | A | | 1/2012 | |
| JP | 2016-519013 | A | | 6/2016 | |
| JP | 6600500 | B2 | * | 10/2019 | |
| WO | WO-2010057231 | A1 | * | 5/2010 | B29C 45/76 |

OTHER PUBLICATIONS

Machine Translation for JP-2008195023-A, obtained Jun. 2025 (Year: 2025).*
Machine Translation for JP-2009137073-A, obtained Jun. 2025 (Year: 2025).*
Machine Translation for JP-H08311503-A, obtained Jun. 2025 (Year: 2025).*
Machine Translation for WO-2010057231-A1, obtained Jun. 2025 (Year: 2025).*
Machine Translation for JP-H06320588-A, obtained Jun. 2025 (Year: 2025).*
Machine Translation for JP-4786186-B2, obtained Nov. 2025 (Year: 2025).*
Machine Translation for JP-6600500-B2, obtained Nov. 2025 (Year: 2025).*
Machine Translation for JP-2004182957-A, obtained Nov. 2025 (Year: 2025).*
Machine Translation for JPH10138308A, obtained Jul. 2026 (Year: 2026).*
Office Action received in DE 112021003916.4, dated May 2, 2024, in 6 pages (with translation).
First Office Action received in CN202180055015.6, dated Mar. 24, 2025, in 18 pages, with translation.
Office Action received in CN202180055015.6, dated Jul. 16, 2025, in 20 pages (with translation).

* cited by examiner

INJECTION MOLDING SUPPORT SYSTEM AND METHOD

CROSS-REFERENCE TO RELATED APPLICATIONS

This application is a U.S. National Stage entry of PCT Application No. PCT/JP2021/036690, filed Oct. 4, 2021, which claims priority to Japanese Patent Application No. 2020-175580, filed Oct. 19, 2020, the contents of which are incorporated herein by reference.

TECHNICAL FIELD

This invention relates to an injection molding support system and method.

BACKGROUND ART

In PTL 1, a prediction function for a molded product quality is determined using a neural network, and a predicted quality value with respect to a specified molding condition selected by a user is displayed.

CITATION LIST

Patent Literature

[PTL 1]
Japanese Patent No. 4167282

SUMMARY OF INVENTION

Technical Problem

In a method described in PTL 1, using the prediction function determined on the basis of data on test molding, the predicted quality value with respect to the specified molding condition selected by a worker is displayed. As a result, in PTL 1, it is necessary to preliminarily acquire the data by the test molding.

A correlation between a quality obtained by injection molding and a molding condition varies depending on a combination of a mold, an injection molding machine, and a material. For example, each of real injection molding machines has a slight but specific machine difference even though the injection molding machines are manufactured under the same design, and the specific machine difference affects a behavior of a resin. In addition, even though, e.g., materials are of the same type (e.g., polypropylene), fluidities thereof greatly differ from each other depending on grades thereof, and accordingly the behaviors of the resins in molds are greatly different from each other even when the same molding condition is input.

In recent years, due to environmental problems such as a problem of marine pollution caused by plastic waste, the utilization of recycled plastic materials has attracted a lot of attention. In some regions, mainly in Europe, taxation and legal restrictions on the use of virgin materials are being examined, and therefore the utilization of recycled materials is an urgent issue for manufacturers of plastic manufactured products.

However, as mentioned above, as the material changes, the correlation between the quality and the molding condition also changes greatly. Accordingly, it is not easy for a manufactured product designer to search for recycled materials in consideration of a fluidity and a molded product quality to be obtained with respect to the product quality required of the manufactured product. When a predicted quality value output on the basis of data on test molding is used as a guideline for material search, as in the case of PTL 1, it is necessary to conduct test molding with a plurality of materials, which requires a large number of man-hours. The same problem arises not only in the case of recycled materials, but also in the case of, e.g., searching for other inexpensive virgin materials from expensive virgin materials.

In addition, recycled materials have greater variations in material properties than those of virgin materials due to thermal history during molding, degradation caused by use environments, and foreign matter contamination and thermal history during recycling. As a result, when a correlation between a quality and a molding condition is to be acquired by test molding, it is necessary to increase the number of measurement points in order to obtain significant data, which requires more man-hours. A designer is required to consider whether or not a material can be used in consideration also of a magnitude of material variation.

This invention has been achieved in view of the problems described above, and an object thereof is to provide an injection molding support system and method which can support a search for an appropriate material.

Solution to Problem

To solve the problems described above, an injection molding support system according to an aspect of this invention is an injection molding support system configured to include one or more computers each including a processor and a storage device, the processor being configured to perform processes of: acquiring a production result using a combination of a mold and a predetermined material and material information of the predetermined material; acquiring, from the storage device, the production result, the material information of the predetermined material, and material information of a plurality of materials acquired in advance, and selecting, on the basis of the acquired information, at least one candidate material from among the plurality of materials; creating a corrected molding condition for performing injection molding by using a combination of the selected candidate material and the mold; and providing a user with the created corrected molding condition and the output candidate material.

Advantageous Effects of Invention

According to this invention, it is possible to select at least one candidate material from among a plurality of materials, create a corrected molding condition for performing injection molding by using a combination of the selected candidate material and a mold, and provide a user with the created corrected molding condition and the output candidate material.

DESCRIPTION OF EMBODIMENTS

Figure 1:
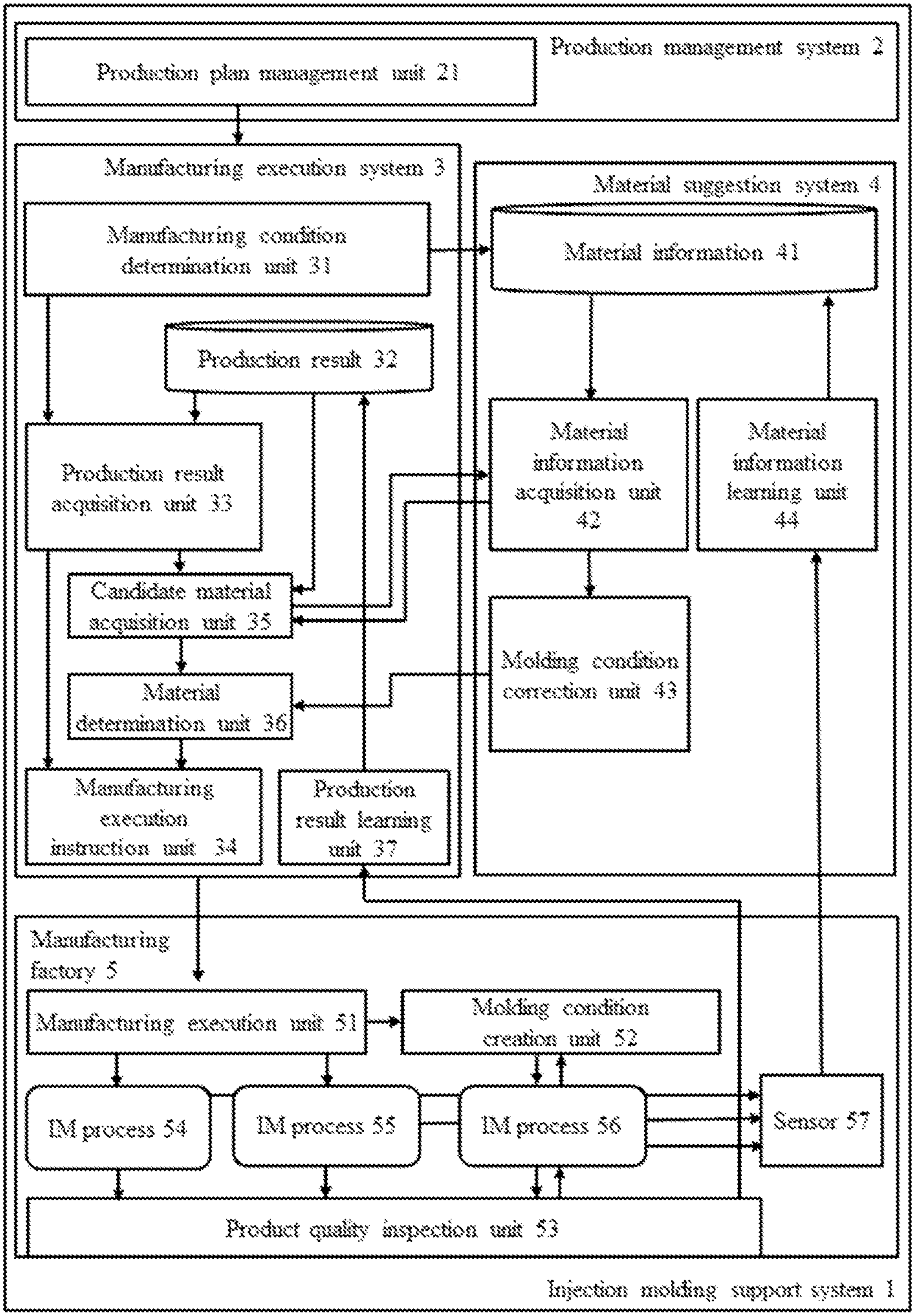
FIG. 1 is a functional block diagram of an injection molding support system.

The following will describe an embodiment of this invention on the basis of the drawings. An injection molding support system according to this embodiment includes the steps of inputting a production result using a combination of a mold and a predetermined material and material information of the predetermined material, outputting at least one candidate material on the basis of each of the production result, the material information of the predetermined material, and material information of a plurality of the candidate materials acquired in advance, and creating a corrected molding condition for performing injection molding using a combination of the output candidate materials and the mold, and provides the candidate materials and the corrected molding condition.

According to this embodiment, with respect to the production result using the combination of the mold and the predetermined material, the at least one candidate material and the corrected molding condition for performing the injection molding by using the combination of the mold and the candidate materials can be provided to an operator by being, e.g., displayed on a screen on the basis of the material information of the predetermined material, the production result, and the material information of the plurality of candidate materials acquired in advance.

The following will describe the embodiment of this invention on the basis of the drawings. This embodiment includes the steps of inputting a production result using a combination of a mold and a predetermined material and material information of the predetermined material, outputting one or more candidate materials on the basis of each of the production result, the material information of the predetermined material, and material information of a plurality of candidate materials acquired in advance, and creating a corrected molding condition for performing injection molding using the combination of the mold and the candidate materials, and displays the candidate materials and the corrected molding condition. A user selects an optional adopted material from among the obtained candidate materials to input the corrected molding condition by using the adopted material and thus allow injection molding to be implemented.

According to this embodiment, in the case of using a mold having a production result using a certain material to mold another material, it is possible to obtain, on the basis of each of the production result that allows a non-defective product to be obtained and the material information acquired in advance, the at least one candidate material that allows a non-defective product to be obtained and an appropriate molding condition (corrected molding condition) when the candidate material is adopted. The candidate material and the corrected molding condition are provided to the user (operator) of an injection molding machine.

In this embodiment, the material information includes a physical quantity corresponding to a fluidity specific to a material. In this embodiment, the physical quantity corresponding to the fluidity specific to the material is acquired in advance, and stored as the material information in association with the material.

In this embodiment, from each of the production result using the combination of the certain mold and the material and the material information acquired in advance, the at least one candidate material and the corrected molding condition when the candidate material and the mold are used are created. In the injection molding support system according to this embodiment, the user is allowed to select one material from among the candidate materials provided from the injection molding support system on the basis of an optional adoption criterion. Then, the user causes injection molding to be performed by using a combination of the mold, the candidate material, and the corrected molding condition. Examples of the optional adoption criterion include material cost, stability of a material supply, a material production area, a material property and a magnitude of variation thereof, the presence or absence of a material adoption result, ease of recycling, a recycled material usage rate, and the like.

It is also possible to score a degree of matching with the adoption criterion and present the candidate material having a high total store to the user.

With the injection molding support system in this embodiment, in the case of using the mold having the production result using the certain material to perform injection molding with the other material, on the basis of each of the production result that allows a non-defective product to be obtained and the material information acquired in advance, the candidate materials each having a matching fluidity can be obtained more quickly than obtained conventionally. Additionally, in the injection molding support system in this embodiment, an appropriate molding condition when the each of obtained candidate materials is used can also be obtained.

As a result, according to this embodiment, in the case of, e.g., using another material instead of a predetermined material, it is possible to inhibit occurrence of a case where, due to a mismatch between a fluidity of another material specified by a designer and a fluidity of the predetermined material, injection molding that satisfies a required product quality cannot be performed.

Moreover, in the injection molding support system according to this embodiment, a skilled worker need not change the configuration of the molding condition for the adopted material, and therefore it is possible to achieve reductions in development lead time and production start lead time and an improvement in molded product quality.

Note that, in this embodiment, a description will be given of a mold opening amount, a speed, a pressure, a temperature, and a volume as examples of physical quantities related to injection molding, but each of these physical quantities may also be a certain predetermined value or may also be a curve (characteristic line) representing a time variation of a value.

First Embodiment

Using FIGS. 1 to 10, a first embodiment will be described. FIG. 1 is a functional block diagram of an injection molding support system 1.

The injection molding system 1 includes, e.g., a production management system 2, a manufacturing execution system 3, a material suggestion system 4, and a manufacturing factory 5. Some or all of individual functions of the injection molding system 1 described below may be configured as software, may be implemented as cooperation between software and hardware, or may be implemented using hardware having a fixed circuit. At least some of these functions may also be implemented using hardware capable of changing some of circuits. At least some of functions of the production management system 2, the manufacturing execution system 3, and the manufacturing factory 5 may also be manually implemented by the operator.

The production management system 2 is a system that manages a production plan, and includes at least a production plan management unit 21. The production plan management unit 21 is a function of generating a production plan including production specifications, quantities, timing, and the like according to an order status and an inventory status.

The manufacturing execution system 3 is a system that gives, to the manufacturing factory 5, an instruction to perform production. The manufacturing execution system 3 determines a manufacturing condition and a molding condition on the basis of the production plan generated by the production management system 2, and sends the production instruction including the manufacturing condition and the molding condition to the manufacturing factory 5. Examples of the manufacturing condition include information specifying an injection molding machine to be used for the production (injection molding), information specifying a mold to be used for the production, information specifying a material to be used for the production, a quantity of molded products to be produced, production timing, required quality, and the like.

A description will be given of the manufacturing execution system 3. The manufacturing execution system 3 includes, e.g., a manufacturing condition determination unit 31, a production result storage unit 32, a production result acquisition unit 33, a manufacturing execution instruction unit 34, a candidate material acquisition unit 35, a material determination unit 36, and a production result learning unit 37.

The manufacturing condition determination unit 31 is a function of determining the manufacturing condition described above on the basis of the production plan generated by the production plan management unit 21 of the production management system 2. The manufacturing condition determination unit 31 can transmit information related to the manufacturing condition to the material suggestion system 4. The information related to the manufacturing condition can include predetermined information related to the mold, the injection molding machine, and the material. Examples of the predetermined information include a capacity of the mold and a runner configuration of the mold. The examples of the predetermined information may further include a product quality required of a molded product to be produced and a property required of the material. Note that the manufacturing condition determination unit 31 can also transmit either one or both of CAD (Computer Aided Design) data of the mold and specification data and configuration data of the injection molding machine as the "predetermined information" to the material suggestion system 4. The material suggestion system 4 causes the information received from the manufacturing condition determination unit 31 to be stored in material information 41.

The production result storage unit 32 is a function of storing a production result. In this embodiment, the production result is the molding condition that has been confirmed to allow a molded product having the required product quality to be obtained with respect to a combination of the injection molding machine, the mold, and the material.

The production result acquisition unit 33 is a function of acquiring the production result from the production result storage unit 32. The production result acquisition unit 33 reads and acquires, from the production result storage unit 32, the production result using the mold (hereinafter referred to as the first mold) determined by the manufacturing condition determination unit 31.

When there is no production result using the first mold, the production result acquisition unit 33 gives, to the manufacturing execution instruction unit 34, a request to give the molding condition for a combination of a first material (hereinafter referred to as the predetermined material) and the first mold that has been determined by the manufacturing condition determination unit 31. The request to give the molding condition is an instruction for causing an appropriate molding condition to be searched for in the manufacturing factory 5. The manufacturing factory 5 that has received the request to give the molding condition finds the appropriate molding condition, while varying various parameters according to the input manufacturing condition.

When there is no production result using the first mold, the material is not specified in the manufacturing condition received from the manufacturing condition determination unit 31, and only the product quality required of the molded product and the property required of the material are specified, the manufacturing execution system 3 inputs the product quality required of the molded product and the property required of the material to the candidate material acquisition unit 35, and gives an instruction to selectively determine a novel candidate material. The novel candidate material is a material to be selectively determined and output by the candidate material acquisition unit 35 when there is no production result using the first mold and there is no specification of the material by the manufacturing execution instruction unit 34. Hereinbelow, the novel candidate material may be referred to also as the novel material.

In the case where there is a production result using a combination of the first mold and the predetermined material, the production result acquisition unit 33 outputs the production result acquired from the production result storage unit 32 to the candidate material acquisition unit 35, and gives an instruction to output (suggest) the candidate material as a substitute material.

In the case where there is a production result using the first mold, but there is no production result using the combination of the first mold and the predetermined material, the production result acquisition unit 33 acquires, from the production result storage unit 32, another material having a production result using the first mold and the production result, and outputs the other material and the production result to the candidate material acquisition unit 35 to give an instruction to suggest the substitute material. Note that the substitute material is a material suggested by the candidate material acquisition unit 35 when there is a production result using the first mold.

The candidate material acquisition unit 35 is a function of acquiring, from the material suggestion system 4, the candidate materials to be used with the first mold determined by the manufacturing condition determination unit 31.

The candidate material acquisition unit 35 is a function of giving, to the material suggestion system 4, a request to generate the candidate materials and a molding condition for a combination of the first mold and each of the candidate materials, and acquiring the at least one candidate material and a corrected molding condition therefor that have been generated in the material suggestion system 4. The candidate material acquisition unit 35 gives a material suggestion and basic information required to produce the molding condition to the material suggestion system 4 to acquire the candidate materials from the material suggestion system 4.

In the suggestion of, e.g., the substitute material, the basic information required to generate the candidate materials includes information on the first mold determined by the manufacturing condition determination unit 31, the first material having the production result in combination with the first mold, and the production result (first production result) using a combination of the first mold and the first material. In the suggestion of the novel candidate material, the basic information includes the information on the first mold determined by the manufacturing condition determination unit 31, the product quality required of the molded product, and the property required of the material. As the information on the first mold, a runner structure, a volume of the molded product, a shape of the molded product, and the like are included.

When acquiring each of the candidate materials and the corrected molding condition therefor from the material suggestion system 4, the candidate material acquisition unit 35 refers to the production result storage unit 32 to acquire the presence or absence of a production result using the candidate material from the production result storage unit 32. When there is a production result (second production result) using a combination of the first mold and the candidate material, the molding condition acquired from the material suggestion system 4 is overwritten with the second production result, and a flag indicating "the presence of an adoption result" is set up.

Meanwhile, when there is no second production result, but there is a production result (third production result) in combination with another mold, the candidate material acquisition unit 35 holds the corrected molding condition acquired from the material suggestion system 4 as is, and sets up a flag indicating the "presence of an adoption result". When there is no production result using the candidate material, the candidate material acquisition unit 35 holds the corrected molding condition acquired from the material suggestion system 4 as is. Then, the candidate material acquisition unit 35 outputs the acquired candidate material, the molding condition therefor or the second production result, and the presence or absence of an adoption result to the material determination unit 36.

The material determination unit 36 is a function of determining an adopted material with which manufacturing is to be executed on the basis of the candidate material, the molding condition therefor or the second production result, and the presence or absence of an adoption result each input from the candidate material acquisition unit 35. The adopted material is a material selected from among the candidate materials. Accordingly, the adopted material may be referred to also as the selected candidate material. The material determination unit 36 determines, from among the one or plurality of candidate materials, the one adopted material on the basis of the optional adoption criterion.

Examples of the optional adoption criterion include the material cost, the stability of a material supply, the material production area, the material property and the magnitude of variation thereof, the presence or absence of an adoption result, the ease of recycling, the recycled material usage rate, and the like.

Which one of the output (provided) candidate materials is to be used can manually or automatically be determined herein. For example, the user may also refer to the displayed candidate materials and manually make a decision. Alternatively, it may also be possible to automatically select the candidate material that allows the configured adoption criterion to have a most excellent value.

For example, the user can manually select, from among the displayed candidate materials, the material having the adoption result and excellent in balance between the material property satisfying a product quality required of a manufactured product and the recycled material usage rate as the adopted material. The material determination unit 36 may also, e.g., configure each of the material property and the cost as the adoption criterion in advance, and automatically select, from among the candidate materials, the material having the material property satisfying the product quality required of the manufactured product and lowest in cost as the adopted material. Note that, when there is no appropriate candidate material for the predetermined material under the optional adoption criterion, the predetermined material is selected as the candidate material. The appropriate candidate material is the candidate material more excellent than the predetermined material under the optional adoption criterion.

When determining the adopted material, the material determination unit 36 outputs, to the manufacturing execution instruction unit 34, the determined adopted material and the molding condition therefor or the second production result. Note that, when the predetermined material is selected as the adopted material, the material determination unit 36 outputs, to the manufacturing execution instruction unit 34, the first production result in conjunction.

The manufacturing execution instruction unit 34 is a function of giving an instruction to execute manufacturing to the manufacturing factory 5. The execution of the manufacturing can also be referred to as production. The manufacturing execution instruction includes, e.g., the request to give the molding condition input by the production result acquisition unit 33, either one of the adopted material and the corrected molding condition therefor each input by the material determination unit 36, and the manufacturing condition determined by the manufacturing condition determination unit 31.

The production result learning unit 37 is a function of causing the molding condition that has been confirmed to allow the excellent molded product quality to be obtained in the manufacturing factory 5 to be stored in the production result storage unit 32. The production result learning unit 37 registers, in the production result storage unit 32, the molding condition under which a product quality equal to or higher than a predetermined criterion is successfully obtained on the basis of information indicating the product quality result of the molded product acquired from a product quality inspection unit 53 of the manufacturing factory 5.

A description will be given of the material suggestion system 4. The material suggestion system 4 is a function of outputting the candidate material and the molding condition. In the suggestion of the substitute material (candidate material), the material suggestion system 4 outputs the candidate materials having a fluidity that may match a fluidity of the predetermined material and the molding condition for a combination of the candidate material having the matching fluidity and the first mold on the basis of each of the production result using the combination of the first mold and the predetermined material that has been input from the manufacturing execution system 3 and the material information of the candidate materials acquired in advance. The material suggestion system 4 also has a function of outputting, in the suggestion of the novel material (novel candidate material), the candidate material satisfying each of the product quality required of the molded product and the property required of the material on the basis of each of the first mold, the product quality required of the molded product, and the property required of the material that have been input from the manufacturing execution system 3.

The material information in this embodiment is information specific to each of the materials. The material information includes not only a model number and specifications of the material, but also a fluidity and a range of a recommended molding condition each specific to the material. The material information can further include the material cost, the stability of a material supply, the material production area, the material property and the magnitude of variation thereof, the presence or absence of an adoption result, the ease of recycling, the recycled material usage rate, and the like.

The fluidity of the material in this embodiment includes information in which an actually measured value of a physical quality at a predetermined position in an injection molding machine or at a predetermined position in a mold when an optional molding condition is input to the injection molding machine to cause the injection molding machine to perform injection molding is associated with the optional molding condition. The fluidity of the material may further include a melt flow rate (MFR) obtained by melt flow rate measurement or a melt viscosity obtained by a capillary rheometer. The fluidity of the material needs to be registered in association with a temperature at least within a range of the recommended molding condition for the material.

Examples of the predetermined position in the injection molding machine for measuring the fluidity include a nozzle leading end portion and the like. Examples of the predetermined position in the mold for measuring the fluidity include a resin inlet port of the mold and the like. Examples of the physical quantity include a pressure of a resin, a temperature of the resin, a speed of the resin, a material property of the resin, and an amount of opening of the mold (mold opening amount). Examples of the material property include a density of the resin, a viscosity of the resin, a distribution of fiber lengths of the resin (in the case of a reinforced fiber containing material), and the like. Among them, the physical quantity most correlated with the fluidity of the material is the viscosity of the resin, but the physical quantity is not limited to the viscosity, and it is also possible to use a feature value correlated with the fluidity that has been calculated from the pressure, the temperature, and the speed.

Examples of the recommended molding condition in this embodiment include a range of the molding condition preliminarily confirmed to be less likely to cause a molding defect which is specified by a material manufacturer. For example, in the case of typical polypropylene, the recommended molding condition of a cylinder temperature is 180 to 280 °C, but the temperature range differs depending on a grade of the material. Parameters each defined as the recommended molding condition include a temperature, a speed, a pressure, a mold clamping force, and the like.

Additionally, examples of the product quality required of the molded product in this embodiment include variations of a size of the molded product at an optional position and a weight of the manufactured product. Examples of the property required of the material include a tensile strength, an impact strength, a Young's modulus, a linear expansion coefficient, a heat resistance, a frame resistance, a chemical resistance, and the like.

A further description will be given of the material suggestion system 4. The material suggestion system 4 includes, e.g., a material information storage unit 41, a material information acquisition unit 42, a molding condition correction unit 43, and a material information learning unit 44.

The material information storage unit 41 is a function of storing the material information acquired in advance for each of the materials.

The material information acquisition unit 42 acquires, from the material information storage unit 41, information on the material (predetermined material) specified from the manufacturing execution system 3. The material information acquisition unit 42 also has a function of retrieving, from among all the candidate materials stored in the material information storage unit 41, the candidate materials each having the fluidity that may match the fluidity of the predetermined material to acquire the candidate material. Alternatively, the material information acquisition unit 42 also has a function of outputting the candidate materials satisfying each of the product quality required of the molded product and the property required of the material on the basis of each of the first mold, the product quality required of the molded product, and the property required of the material each specified from the manufacturing execution system 3.

In the suggestion of the substitute material, the material information acquisition unit 42 acquires information on the predetermined material from the material information storage unit 41. The material information acquisition unit 42 also acquires, from the information on the predetermined material, the fluidity of the predetermined material at a cylinder temperature in the first production result. Then, the material information acquisition unit 42 refers to the material information of all the candidate materials registered in the material information storage unit 41 to acquire, as the candidate material, the candidate materials each having the fluidity that may match the fluidity of the predetermined material within the range of the recommended molding condition specific to the candidate material.

For example, it is assumed that the cylinder temperature in the first production result is 190 °C. It is assumed that the cylinder temperature under the recommended molding condition for a certain material is 180 to 210 °C. When the fluidity of the material matches the fluidity of the predetermined material at a cylinder temperature of 210 °C, the material information acquisition unit 42 selects this material as the candidate material, and acquires the information on the selected candidate material from the material information storage unit 41.

The material information acquisition unit 42 outputs, to the molding condition correction unit 43, the material information of the candidate material thus obtained and the predetermined material information and the first production result each acquired from the manufacturing execution system 3. Alternatively, when the candidate material having the matchable fluidity is not found, the material information acquisition unit 42 notifies the molding condition correction unit 43 that there is no candidate material.

In the suggestion of the novel material, the material information acquisition unit 42 refers to the material information of all the candidate materials registered in the material information storage unit 41 to acquire the candidate material satisfying the property required of the input material. For example, when acceptable ranges of the linear expansion coefficient, the Young's modulus, and the heat resistance are specified each as the property required of the material, those of the materials stored in the material information storage unit 41 that satisfy all the specified properties are acquired as the novel materials (novel candidate materials). The material information acquisition unit 42 outputs the at least one novel material obtained to the manufacturing execution system 3.

The molding condition correction unit 43 corrects the molding condition on the basis of the information input from the material information acquisition unit 42. The molding condition correction unit 43 is a function of correcting the molding condition on the basis of the predetermined material information, the material information of the candidate material, and the production result using the combination of the first mold and the predetermined material each input from the material information acquisition unit 42 to thereby produce the corrected molding condition. For example, when the fluidity of the candidate material matches the fluidity of the predetermined material at the 210 °C cylinder temperature, the "210 °C cylinder temperature" is used as the corrected molding condition. The molding condition correction unit 43 outputs the material information of each of the candidate materials and the corrected molding condition associated with each of the candidate materials to the candidate material acquisition unit 35 of the manufacturing execution system 3.

The material information learning unit 44 is a function of extracting the feature value of the physical quantity on the basis of data (sensing data) from a sensor 57 and storing this feature value as the material information in the material information storage unit 41. The sensor 57 is provided in an injection molding mechanism 50 or the mold. The material information learning unit 44 extracts the feature value from the sensing data in an injection molding process 54 obtained from the manufacturing factory 5, and stores the extracted feature value as the material information in the material information storage unit 41.

A description will be given of the manufacturing factory 5. The manufacturing factory 5 receives the manufacturing execution instruction from the manufacturing execution system 3 to execute any one or more of injection molding processes 54 to 56. In FIG. 1, injection molding may be abbreviated as "IM".

For example, the manufacturing factory 5 includes a manufacturing execution unit 51, a plurality of the injection molding machines 50 (described later with FIG. 3), a plurality of the molds (described later with FIG. 3), a molding condition creation unit 52, and the molded product quality inspection unit 53. Hereinbelow, the molded product quality inspection unit 53 may be referred to simply as the product quality inspection unit 53.

The manufacturing execution unit 51 executes the injection molding processes on the basis of manufacturing condition input from the manufacturing execution instruction unit 34 of the manufacturing execution system 3. When receiving the corrected molding condition, the manufacturing execution unit 51 applies the corrected molding condition to the combination of the mold and the material indicated by the manufacturing condition, and executes the injection molding process 54. In other words, the injection molding process 54 is a process of using the specified combination of the mold and the material to perform injection molding on the basis of the corrected molding condition.

The manufacturing execution unit 51 inputs the production result to the indicated combination of the mold and the material to thereby execute the injection molding process 55. In other words, the injection molding process 55 uses the specified combination of the mold and the material to execute the injection molding processes under the molding condition having a result of non-defective product production.

When receiving the input request to give the molding condition, the manufacturing execution unit 51 gives, to the molding condition creation unit 52, an instruction to give the molding condition. When receiving the request to give the molding condition from the manufacturing execution unit 51, the molding condition creation unit 52 derives an optimum molding condition that allows non-defective products to be stably obtained. In deriving the molding condition, by preliminarily analyzing a flow of the resin and finding an approximate molding condition, it is possible to shorten the time required to obtain the molding condition.

When it is successfully confirmed in the product quality inspection unit 53 that non-defective products can stably be obtained on the basis of the derived molding condition, the derived molding condition is input, and the injection molding process 56 is performed. In other words, the injection molding process 56 is a process of deriving the molding condition and performing injection molding according to the derived molding condition.

The product quality inspection unit 53 is a function of determining whether or not the product quality of the molded product obtained in the injection molding processes is acceptable. The molded product quality is evaluated on the basis of, e.g., a size, an amount of warp, burr, a scratch, glow, color, and the like. The product quality inspection of the molded product may automatically be performed, may manually be performed by an inspector, or may semi-automatically be performed.

When the product quality of the molded product is excellent, the product quality inspection unit 53 outputs, to the production result learning unit 36 of the manufacturing execution system 3, the manufacturing condition, the combination of the injection molding machine and the mold, the molding condition, and a result of inspecting the molded product quality.

Note that molding machine specific information according to this embodiment is acquired by the sensor 57 mounted in advance in each of the injection molding machines and the mold held by the manufacturing factory 5 by measuring the physical quantity at the predetermined position in the mold and outputting the physical quantity to the molding condition correction system 4.

Figure 2:
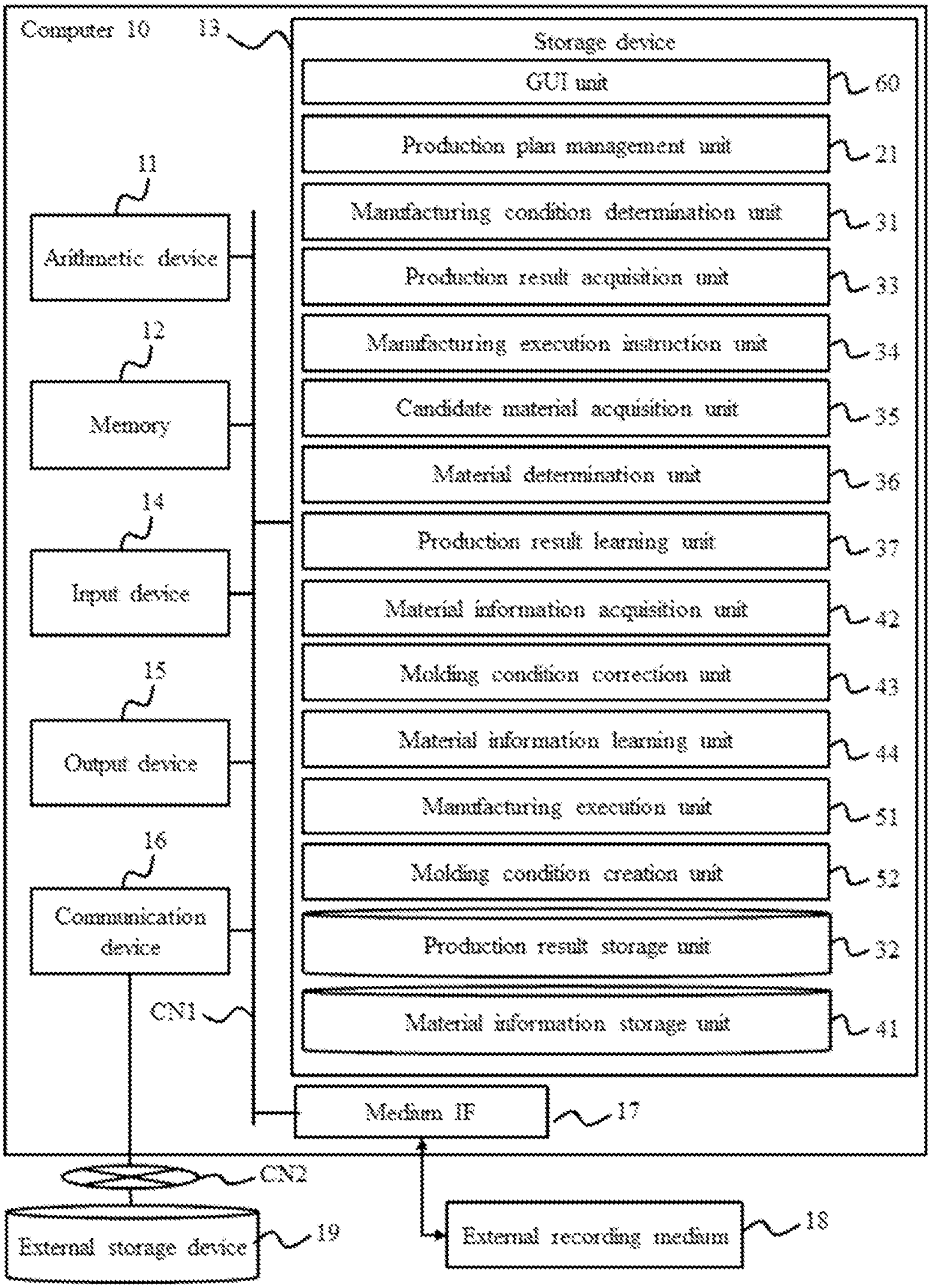
FIG. 2 is an illustrative view illustrating a hardware configuration and a software configuration of a computer that can be used to implement the injection molding support system.

FIG. 2 illustrates an example of a configuration of a computer 10 that can be used to implement the injection molding system 1 in this embodiment. The case where the injection molding system 1 is implemented from the one computer 10 is described herein, but the injection molding system 1 is not limited thereto. The at least one injection molding system 1 can also be built by causing a plurality of the computers to cooperate with each other. Alternatively, as described above, at least some of respective functions of the production management system 2, the manufacturing execution system 3, and the manufacturing factory 5 may also be implemented by the operator without using dedicated software or hardware.

As in other embodiments described later, it is also possible to build the material suggestion system 4 as software functioning on a cloud server and share the material suggestion system 4 among a plurality of the users. In this case, the material information recorded in the material information storage unit 41 can be shared among the plurality of users. In this case, as the number of the users increases, there are more cases where the candidate materials and the corrected molding conditions can be acquired by utilizing the material information of the candidate materials acquired by the other users. Accordingly, when the material suggestion system 4 is built on the cloud server and shared by the plurality of users, man-hours required to acquire the material information can be reduced.

The computer 10 includes, e.g., an arithmetic device 11, a memory 12, a storage device 13, an input device 14, an output device 15, a communication device 16, and a medium interface unit 17, and the individual devices 11 to 17 are coupled by a communication path CN1. The communication path CN1 is, e.g., an internal bus, a LAN (Local Area Network), or the like.

The arithmetic device 11 is configured to include, e.g., a processor or the like. The arithmetic device 11 reads a computer program stored in the storage device 13 into the memory 12 and executes the computer program to implement the individual functions 21, 31, 33 to 37, 42 to 44, 51, 52, and 60 each as the injection molding analysis system 1.

As an example of the processor, a CPU (Central Processing Unit) or a GPU (Graphics Processing Unit) can be considered, but the processor may also be another semiconductor device as long as the semiconductor device is a subject that executes predetermined processing. As in the embodiment described later, in a server-client system including a server computer and a client computer, the client computer updates a screen of a user interface on the basis of an instruction from the server computer or acquires information input from the user and transmits the information to the server computer.

The storage device 13 is a device that stores the computer program and data, and has a rewritable storage medium such as, e.g., a flash memory or a hard disk. In the storage device 13, a computer program for implementing the GUI unit 60 that provides the operator with a GUI (Graphical User Interface) and a computer program for implementing each of the functions 21, 31, 33 to 37, 42 to 44, 51, and 52 described above are stored. Through the use of a storage area of the storage device 13, the production result storage unit 32 and the material information storage unit 41 are implemented.

The input device 14 is a device with which the operator inputs information to the computer 10. Examples the input device 14 include a keyboard, a touch panel, a pointing device such as a mouse, a voice instruction device, and the like (each of which is not shown). The output device 15 is a device with which the computer 10 outputs information. Examples of the output device 15 include a display, a printer, a voice synthesizer, and the like (each of which is not shown).

The communication device 16 is a device that causes an external information processing device and the computer 10 to communicate with each other via a communication path CN2. As the external information processing device, there is an external storage device 19 besides a computer not shown. The computer 10 can read data (such as the molding machine specific information and the production result) and the computer program each stored in the external storage device 19. The computer 10 can also transmit all or part of the computer programs and data each stored in the storage device 13 to the external storage device 19 for storage therein.

The medium interface unit 17 is a device that performs reading and writing to an external recording medium 18. Examples of the external recording medium 18 include a USB (Universal Serial Bus) memory, a memory card, a hard disk, and the like. It is possible to transfer the computer programs and data from the external recording medium 18 to the storage device 13 or it is also possible to transfer all or part of the computer programs and data stored in the storage device 13 to the external recording medium 18 for storage thereon.

Figure 3:
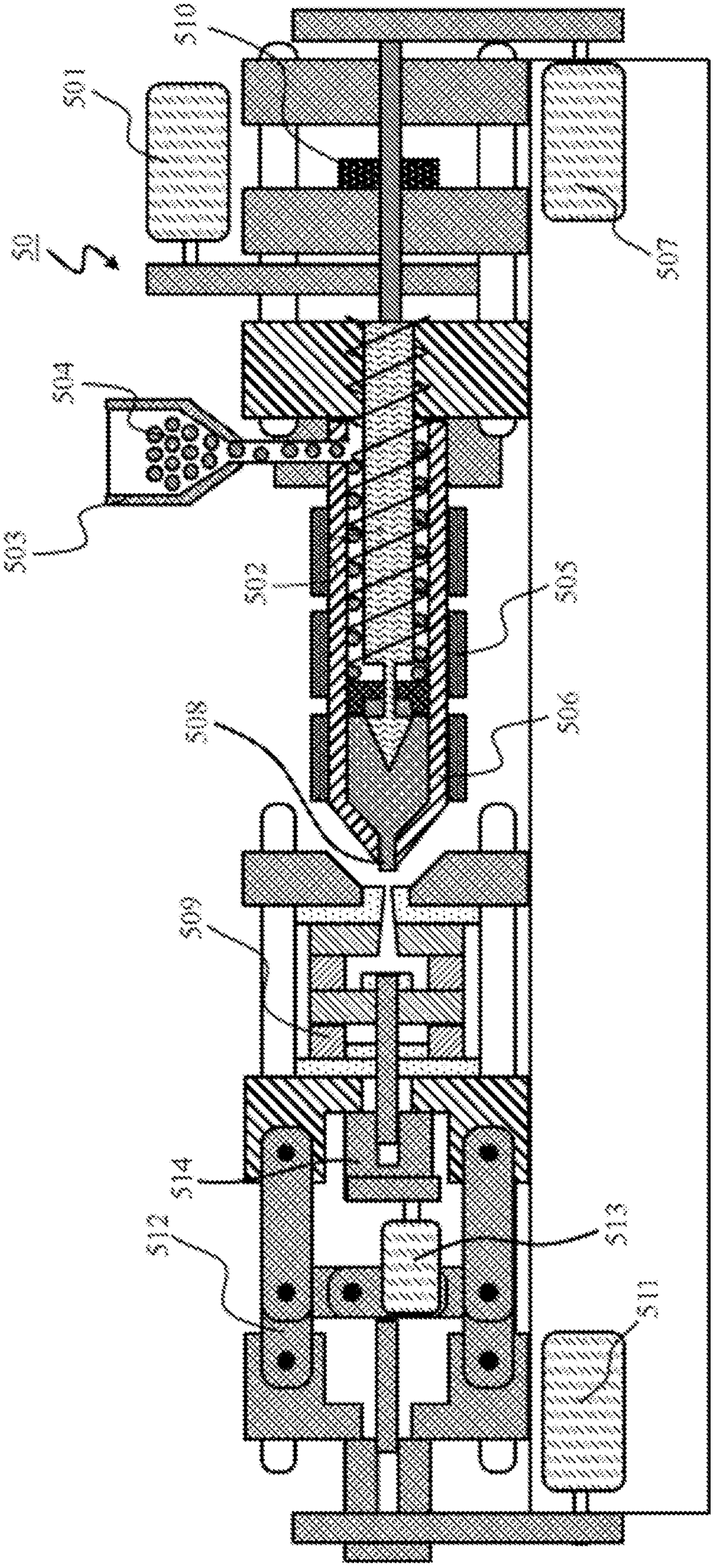
FIG. 3 is a cross-sectional view illustrating a configuration of an injection molding machine.

FIG. 3 illustrates an overview of each of the injection molding machines 50. Using FIG. 3, each of steps of the injection molding processes will be described. In this embodiment, a molding phenomenon indicates a series of phenomena occurring in the injection molding processes. In this embodiment, the injection molding processes are roughly divided into a weighing and plasticization step, an injection and pressure holding step, a cooling step, and a retrieval step.

In the weighing and plasticization step, a screw 502 is retracted using a plasticization motor 501 for a drive force, and resin pellets 504 are fed from a hopper 503 into a cylinder 505. Then, by heating with heaters 506 and rotation of the screw 502, a resin is plasticized into an evenly molten state. Depending on the configuration of a back pressure and the number of rotations of the screw 502, a density of the molten resin and a degree of rupture of reinforced fiber vary. These variations affect the molded product quality.

In the injection and pressure holding step, the screw 502 is advanced using an injection motor 507 for the drive force to inject the molten resin into a mold 509 via a nozzle 508. On the molten resin injected into the mold 509, cooling from a wall surface of the mold 509 and shear heating resulting from a flow act in parallel. In other words, the molten resin flows toward the inside of a cavity of the mold 509, while receiving a cooling effect and a heating effect.

After the mold 509 is filled with the molten resin, the molten resin corresponding to a volume shrinkage caused by the cooling of the molten resin is fed into the mold 509 by holding a pressure. When a mold clamping force serving as a force that closes the mold 509 is small relative to a pressure during injection and a pressure during pressure holding, slight mold opening occurs after solidification of the molten resin, and the resulting minute gap affects the molded product quality.

In the cooling step, the mold 509 held at a given temperature cools the molten resin to a temperature equal to or lower than a solidification temperature. A residual stress generated in the cooling step affects the molded product quality. The residual stress is caused by anisotropy of a material property resulting from a flow in the mold, a density distribution due to pressure holding, unevenness of a molding shrinkage ratio, or the like.

In the retrieval step, a mold clamping mechanism 512 is driven by using a motor 511 that opens and closes the mold 509 for the drive force to open the mold 509. Then, an ejector mechanism 514 is driven by using an ejection motor 513 for the drive force to retrieve the solidified molded product from within the mold 509. Then, the mold 509 is closed for a next shot. In the case of retrieving the molded product from the mold 509, when a sufficient ejection force does not evenly act on the molded product, a residual stress remains in the molded product to affect the product quality of the molded product.

In the injection molding machine 50, pressure control is performed such that a pressure value due to a load cell 510 approaches a pressure value in the input molding condition. A temperature of the cylinder 505 is controlled by the plurality of heaters 506. A shape of the screw 502, a shape of the cylinder 505, and a shape of the nozzle 508 cause a pressure loss differing from one injection molding machine to another. As a result, a pressure in the resin inlet port of the mold 509 has a value lower than a pressure shown in the molding condition input to the injection molding machine. In addition, due to a layout of the heaters 506 and the shear heating of the resin in the nozzle portion, a resin temperature in the resin inlet port of the mold 509 may be different from a resin temperature shown in the molding condition input to the injection molding machine.

A configuration (such as the shape of the screw 502, the shape of the cylinder 505, the shape of the nozzle 508, and the layout of the heaters 506) of an injection mechanism differs from one injection molding machine to another. Therefore, by correcting the molding condition such that the physical quantity of the molten resin in the resin inlet port of the mold 509 is equal, the same molded product quality can be obtained even when different injection molding machines are used.

Likewise, when a material is changed from, e.g., the predetermined material to the candidate material, by correcting the molding condition such that the fluidity of the molten resin in the resin inlet port of the mold 509 is equal, it is possible to ensure an identical molded product quality even with different materials.

The product quality of the molded product is evaluated by a shape property (such as weight, length, thickness, sink, burr, or warp), a surface property (such as weld, silver, burn, whitening, scratch, air bubble, peeling, flow mark, jetting, or color/glow) such as poor appearance, and a mechanical/optical property) (such as tensile strength, impact resistance, or transmission).

The shape property is strongly correlated with pressure and temperature histories and with the mold clamping force in the injection and pressure holding step and in the cooling step. Occurring phenomena of the surface property are caused by different factors. For example, the flow mark and the jetting are strongly correlated with a temperature and a speed of the resin in an injection step. In the case of, e.g., the tensile strength, the mechanical property and the optical property need evaluation in a fracture test, and are therefore mostly evaluated by another correlated product quality index such as weight.

For the molding condition, parameters corresponding to the individual steps of the injection molding processes are configured. For the weighing and plasticization step, a weighing position, a suckback, a back pressure, a back pressure speed, the number of rotations, and the like are configured. For the injection and pressure holding step, each of a pressure, a temperature, time, and a speed is configured. For the injection and pressure holding step, a screw position (VP switch position) where injection and pressure holding are switched to each other and the mold clamping force for the mold 509 are also configured. For the cooling step, cooling time after pressure holding is configured. As parameters related to the temperature, temperatures of the plurality of heaters 506, a temperature of a coolant for cooling the mold 509, a flow rate thereof, and the like are configured.

Figure 4:
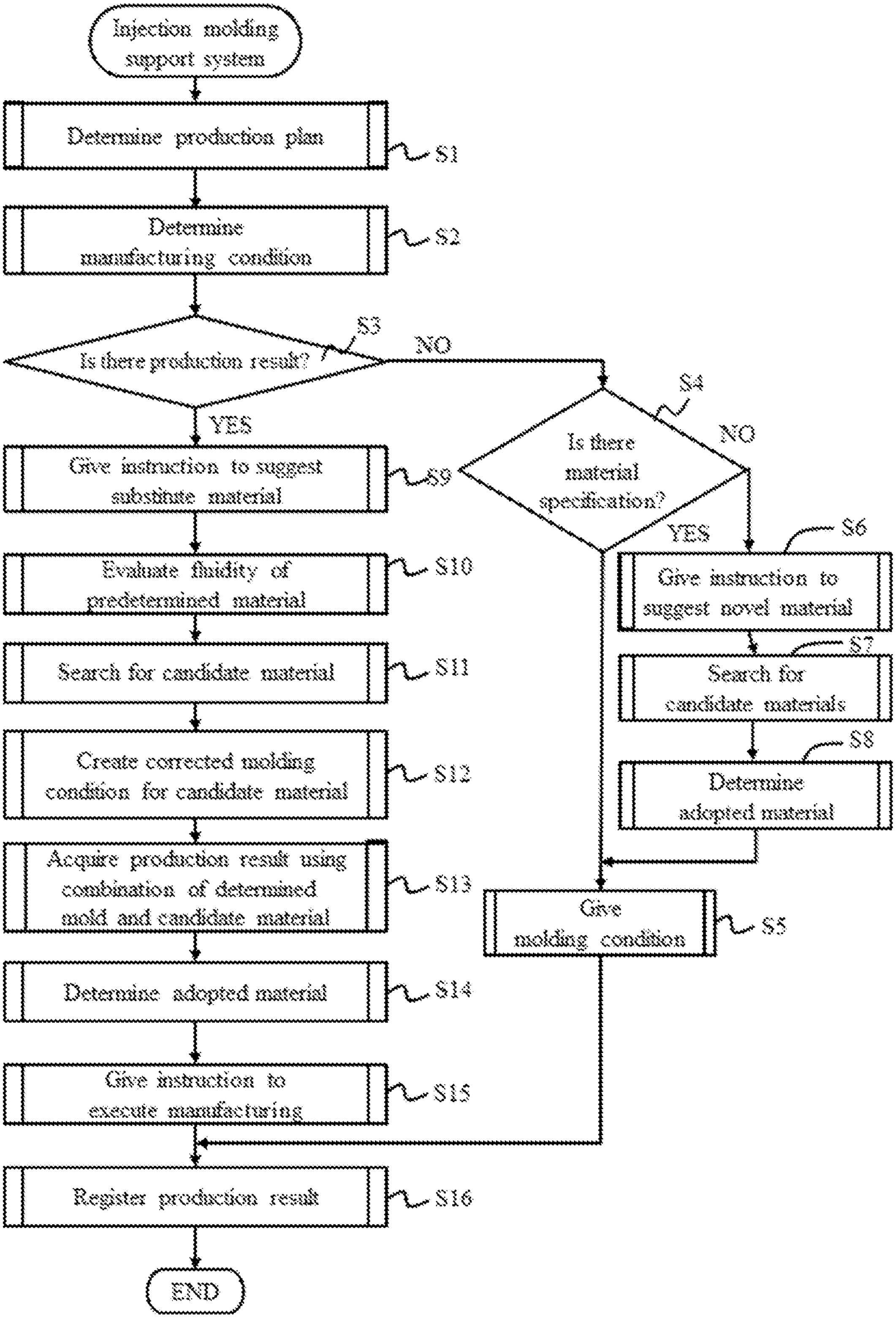
FIG. 4 is a flow chart illustrating a method of implementing the injection molding support system.

FIG. 4 is a flow chart illustrating an example of an injection molding method to be implemented by the injection molding support system 1. In the figure, the injection molding machine is simply referred to as the molding machine. Hereinbelow, the first mold may be referred to also as the determined mold or the predetermined mold, while a first injection molding machine may be referred to also as the determined molding machine or the predetermined molding machine.

The production management system 2 acquires, from the production plan management unit 21 implemented by the GUI unit 60, an order status, an inventory status, and the like serving as information for determining the production plan (S1). For example, the operator determines optimum production specifications, quantities, and timing from the order status and the inventory status each displayed on the GUI to generate the production plan (S1). Alternatively, it is also possible to introduce a mathematical planning model and an algorithm each for optimizing the entire logistic and thereby automatically generate the production plan.

The manufacturing execution system 3 acquires, from the manufacturing condition determination unit 31 implemented by the GUI unit 60, the production plan, and determines the manufacturing condition (S2). For example, the operator determines an optimum combination of the injection molding machine and the mold from the production plan and an operational status of the injection molding machines in the manufacturing factory 5. Alternatively, it is also possible to introduce a mathematical planning model and an algorithm each for optimizing a production efficiency and thereby automatically determine the manufacturing condition. Still alternatively, as the manufacturing condition, a material to be used can also be specified temporarily irrespective of the presence or absence of the production result using the combination of the determined mold and the injection molding machine. Yet alternatively, it is also possible to specify the product quality required of the molded product and the property required of the material.

In the manufacturing execution system 3, the production result acquisition unit 33 implemented by the GUI unit 60 refers to a production result using the mold determined in Step S2 that has been recorded in the production result storage unit 32, and determines the presence or absence of the production result (S3). When there is no production result using the determined mold (NO in S3), the manufacturing execution system 3 moves to S4. When there is a production result using the determined mold (YES in S3), the manufacturing execution system 3 moves to Step S9.

The production result acquisition unit 33 determines whether or not the material is specified under the determined manufacturing condition determined in Step S2 (S4). When the material is specified (YES in S4), the production result acquisition unit 33 gives, to the manufacturing execution instruction unit 34, a request to give the molding condition for the combination of the determined mold and the specified material (predetermined material). When the material is not specified (NO in S4), the production result acquisition unit 33 gives, to the candidate material acquisition unit 35, a request to suggest the novel material (S6).

In the manufacturing execution system 3, when the request to give the molding condition is input thereto from the production result acquisition unit 33 or the material determination unit 36, the manufacturing execution instruction unit 34 implemented by the GUI unit 60 gives, to the manufacturing factory 5, an instruction to give the molding condition (S5).

For example, in the molding condition creation unit 52, the operator checks the instruction to give the molding condition from the manufacturing execution unit 51 implemented by the GUI unit 60. The operator performs the injection molding processes using the combination of the determined injection molding machine and the determined mold to derive the optimum molding condition that allows non-defective products to be stably obtained (S5). In Step S5, by deriving the theoretically optimum molding condition in advance by resin flow analysis, it is possible to reduce the number of times (the number of trials and errors) the injection molding processes are repeated in giving the molding condition.

Meanwhile, in the manufacturing execution system 3, when a request to suggest the novel material is given thereto from the production result acquisition unit 33, the candidate material acquisition unit 35 implemented by the GUI unit 60 inputs, to the material suggestion system 4, the mold determined by the manufacturing condition determination unit 31, the product quality required of the molded product, and the property required of the material to give the instruction to suggest at least one candidate material (S6).

The material information acquisition unit 42 of the material suggestion system 4 refers to the information of the materials stored in advance in the material information storage unit 41 to acquire at least one candidate material satisfying the property required of the material that has been input from the manufacturing execution system 3, and outputs the candidate materials to the manufacturing execution system 3 (S7).

In the manufacturing execution system 3, the material determination unit 36 implemented by the GUI unit 60 determines, on the basis of the optional criterion, the material to be adopted from among the candidate materials input from the material suggestion system 4 (S8). In addition, the material determination unit 36 gives, to the manufacturing execution instruction unit 34, a request to derive the molding condition for the combination of the determined mold and the adopted material (S8).

When there is a production result using the determined mold, the candidate material acquisition unit 35 inputs the mold determined by the manufacturing condition determination unit 31, the predetermined material, and the first production result using the combination of the predetermined material and the determined mold to the material suggestion system 4 to give the instruction to suggest the candidate material (S9).

However, when the material is not specified in the manufacturing condition determination unit 31, the candidate material acquisition unit 35 selects, from among materials each having a production result in combination with the determined mold that have been acquired by the production result acquisition unit 33, any one as the predetermined material (S9).

The material information acquisition unit 42 refers to the material information stored in advance in the material information storage unit 41 to evaluate a fluidity of the predetermined material at a cylinder temperature in the first production result input from the manufacturing execution system 3 (S10).

The material information acquisition unit 42 refers to the information on the candidate materials stored in advance in the material information storage unit 41 to acquire, as the candidate material, the material having the fluidity that may match the fluidity of the predetermined material within the range of the recommended molding condition specific to the candidate material (S11).

The material information acquisition unit 42 outputs, to the molding condition correction unit 43, the material information of the obtained candidate material, the predetermined material information, the first production result, and the fluidity of the predetermined material evaluated in Step 10 (S11). Alternatively, when the candidate material having the matchable fluidity is not found, the material information acquisition unit 42 outputs to the molding condition correction unit 43 that there is no candidate material (S11).

The molding condition correction unit 43 generates, from the predetermined material information, the material information of the candidate materials, the first production result, and the fluidity of the predetermined material each input from the material information acquisition unit 42, the corrected molding condition for the combination of the determined mold and the candidate material (S12). The molding condition correction unit 43 outputs the material information of the candidate material and the corrected molding condition associated with the candidate material to the candidate material acquisition unit 35 of the manufacturing execution system 3 (S12). When there are a plurality of the candidate materials, the molding condition correction unit 43 outputs the material information of each of the candidate materials and the corrected molding condition for each of the candidate materials to the manufacturing execution system 3 (S12).

The candidate material acquisition unit 35 refers to the production result storage unit 32 for the candidate material input from the material suggestion system 4 to acquire a production result in combination with the determined mold (first mold) (S13). When there is the production result (second production result) using the combination of the determined mold and the candidate material, the candidate material acquisition unit 35 overwrites the molding condition acquired from the material suggestion system 4 with the second production result, and sets up the flag indicating "the presence of an adoption result".

By contrast, when there is no second production result, but there is the production result (third production result) in combination with another mold, the candidate material acquisition unit 35 holds the corrected molding condition acquired from the material suggestion system 4 as is, and sets up the flag indicating "the presence of an adoption result". When there is no production result using the candidate material, the candidate material acquisition unit 35 holds the corrected molding condition acquired from the material suggestion system 4 as is. The candidate material acquisition unit 35 outputs, to the material determination unit 36, the acquired candidate material, the molding condition therefor or the second production result, and the presence or absence of an adoption result (S13).

The material determination unit 36 determines, from among the candidate materials input from the material suggestion system 4, the candidate material (adopted material) to be adopted on the basis of the optional criterion (S14). The material determination unit 36 outputs, to the manufacturing execution instruction unit 34, the adopted material and the corrected molding condition for the adopted material that has been acquired by the candidate material acquisition unit 35 or the second production result (S14).

In the manufacturing execution system 3, the manufacturing execution instruction unit 34 implemented by the GUI unit 60 outputs a manufacturing execution instruction to the manufacturing factory 5 (S15). The manufacturing execution instruction includes the manufacturing condition determined in Step 2, the adopted material input in Step 14, and the corrected molding condition for the adopted material or the second production result.

The operator in the manufacturing factory 5 checks the determined manufacturing condition, the adopted material, and the production result or the corrected molding condition, and can give the manufacturing execution instruction to the manufacturing factory 5 when determining that details thereof have no problem. Alternatively, the operator can also provide the candidate material and the corrected molding condition appropriate for the candidate material without checking the details of the determined production result or the corrected molding condition.

The operator checks details of the manufacturing execution instruction via the manufacturing execution unit 51 implemented by the GUI unit 60, and causes the injection molding processes to be executed according to the indicated combination of the injection molding machine, the mold, the material, and the molding condition (S15).

When the product quality of the molded product obtained by the injection molding processes executed in Step S5 or Step S15 is excellent, the molded product quality inspection unit 53 causes, e.g., the manufacturing condition, the combination of the mold and the material, the molding condition, and a result of inspecting the molded product quality to be registered in the production result learning unit 36 (S16). The operator can use the GUI unit 60 in order to register these information items in the production result learning unit 36.

As a result, when the same combination of the mold and the material is determined as the manufacturing condition at the next and subsequent times, it is possible to execute manufacturing on the basis of the production result stored in the production result storage unit 32. Alternatively, when the adopted material is to be determined from among the candidate materials, it is possible to use the presence or absence of a production result as one of determination criteria.

Figure 5:
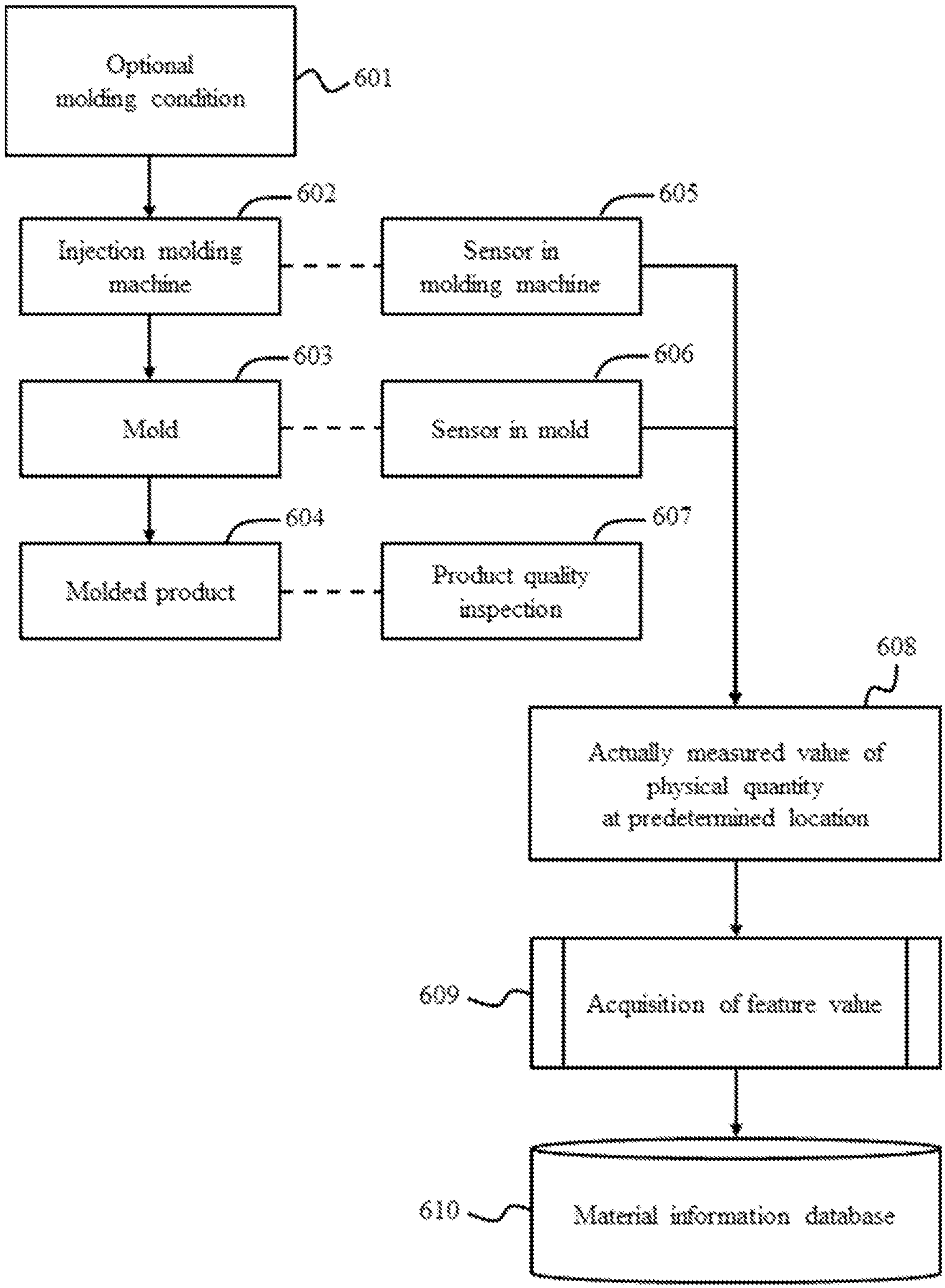
FIG. 5 is a block diagram illustrating a method of acquiring material specific information.

FIG. 5 is a block diagram illustrating an example of a method of acquiring the material information. The method of acquiring the material information illustrated in FIG. 5 is implemented by using any of a “mold with a sensor”, a “mold with an embedded sensor”, and an “injection molding machine with a sensor” each having a sensor that measures a predetermined physical quantity provided at a predetermined position.

First, an optional molding condition 601 is input to a real injection molding machine 602 to acquire a physical quantity at the predetermined location in the mold. The injection molding machine 602 corresponds herein to the injection molding machine 50 described with FIG. 3.

The molding condition 601 need not be one molding condition, and may also include a plurality of conditions. Within a range that allows a non-defective product to be obtained as the molded product quality, it is possible to acquire the physical quantities under various molding conditions. In particular, it is preferable to try a plurality of molding conditions within the range of the recommended molding condition for the material.

Of the material information, the fluidity of the material may vary depending on a configured value of the resin temperature or an injection speed, and consequently may not be valid even when acquired under one molding condition.

To acquire a molding phenomenon in the real injection molding machine 602, there is a method using a sensor 605 in the molding machine or a sensor 606 in the mold. An example of a sensor 705 in the molding machine is the load cell 510 illustrated in FIG. 3.

In the case of using the sensor 605 in the molding machine, for example, an air shot in which injection is performed without attachment of a mold 603 is performed. By observing an output of the load cell 510 during the air shot, it is possible to indirectly measure a pressure loss due to the injection mechanism. Alternatively, a sensor is mounted in a nozzle portion to measure a state of a resin shortly before the resin flows into the mold. In the case of measuring the resin temperature, it is also possible to directly measure the temperature of the resin obtained by the air shot with a thermometer or the like.

In the case of using the sensor 606 in the mold, by placing the sensor at an optional position in the mold 603, it is possible to directly measure the molding phenomenon in the mold 603 and acquire an actually measured value 608 of the physical quantity. Note that the product quality of the molded product 704 can be acquired by a product quality inspection 607.

From the obtained physical quantities, feature values are acquired (609). Each of the obtained physical quantities is acquired as a time variation during the injection molding processes, and therefore it is difficult to directly evaluate the obtained physical quantity. Accordingly, in this embodiment, a feature value correlated with the fluidity of the material is acquired from the time variation of the physical quantity to allow the fluidity of the material to be quantitatively evaluated.

In this embodiment, the obtained feature value and the optional molding condition input first are associated with each other and recorded in a material information database 610. The material information database 610 corresponds to the material information storage unit 41 in FIG. 1.

Figure 6:
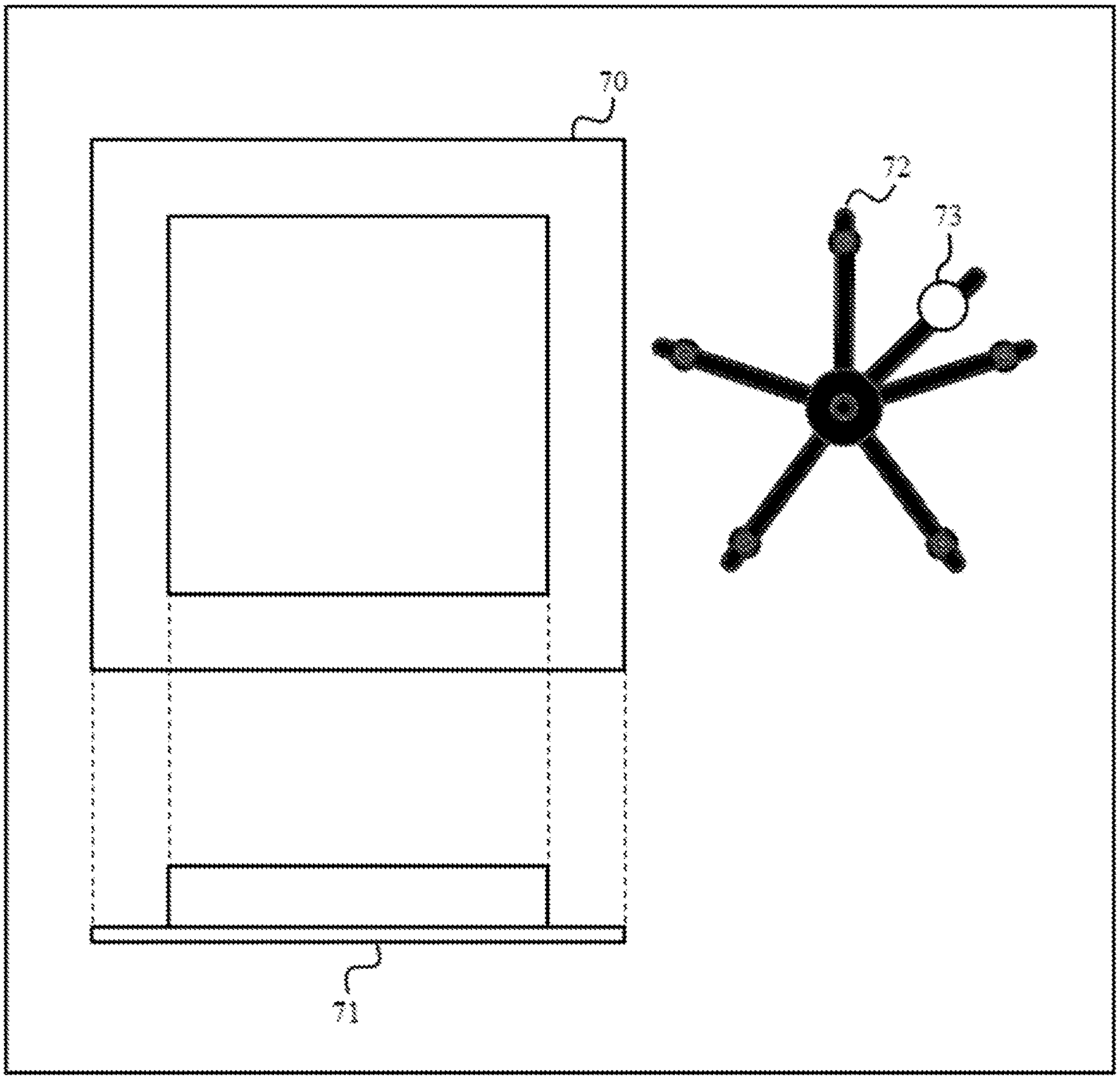
FIG. 6 is an illustrative view illustrating an overview of an experiment for confirming effects of this embodiment.

FIG. 6 illustrates an overview of an example of an experiment that verifies a method of acquiring the fluidity of the material according to this embodiment. FIG. 6 illustrates a top view 70 of a product portion, a side view 71 of the product portion, and a top view 72 of a runner portion. In the present experiment example, a structure is used in which a resin flows into the product portion from the runner portion by a 5-point pin gate method. In a real molding experiment, a pressure sensor (not shown) is placed in a sensor placement portion 73 of the runner and, as the molding phenomenon, a time variation of a pressure in the runner portion 72 was acquired.

Of the data obtained in the present experiment example, an integral value of the pressure from an injection start time to a time at which the pressure reached a maximum value was acquired as the “feature value” from the pressure sensor. As the material used for molding, polybutylene terephthalate (PBT) was used. As the injection molding machine, an electric injection molding machine having a maximum mold clamping force of 150 t and a screw diameter of 44 mm was used.

Figure 7:
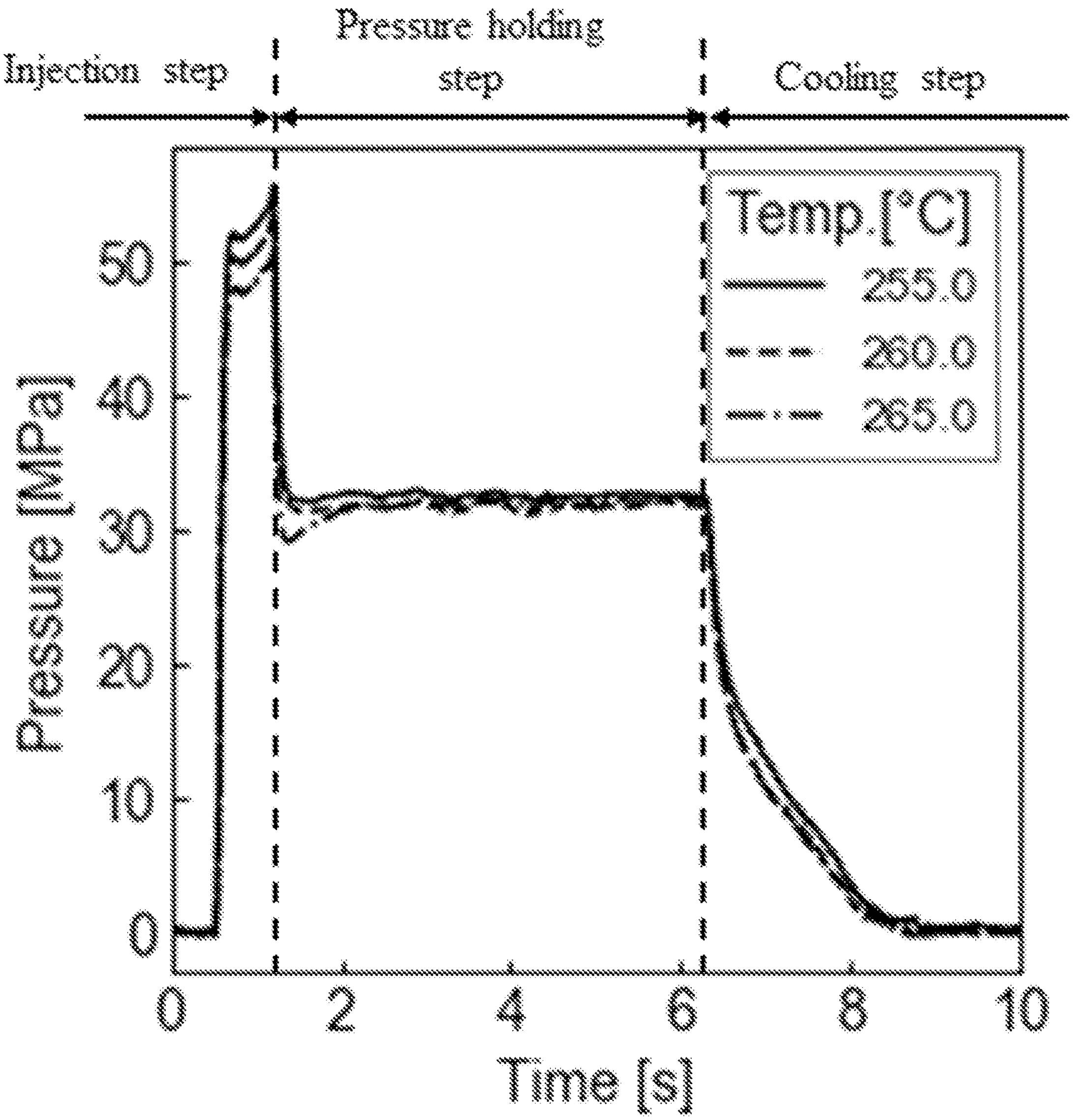
FIG. 7 is a graph illustrating a runner portion pressure varying with a resin temperature.
Figure 8:
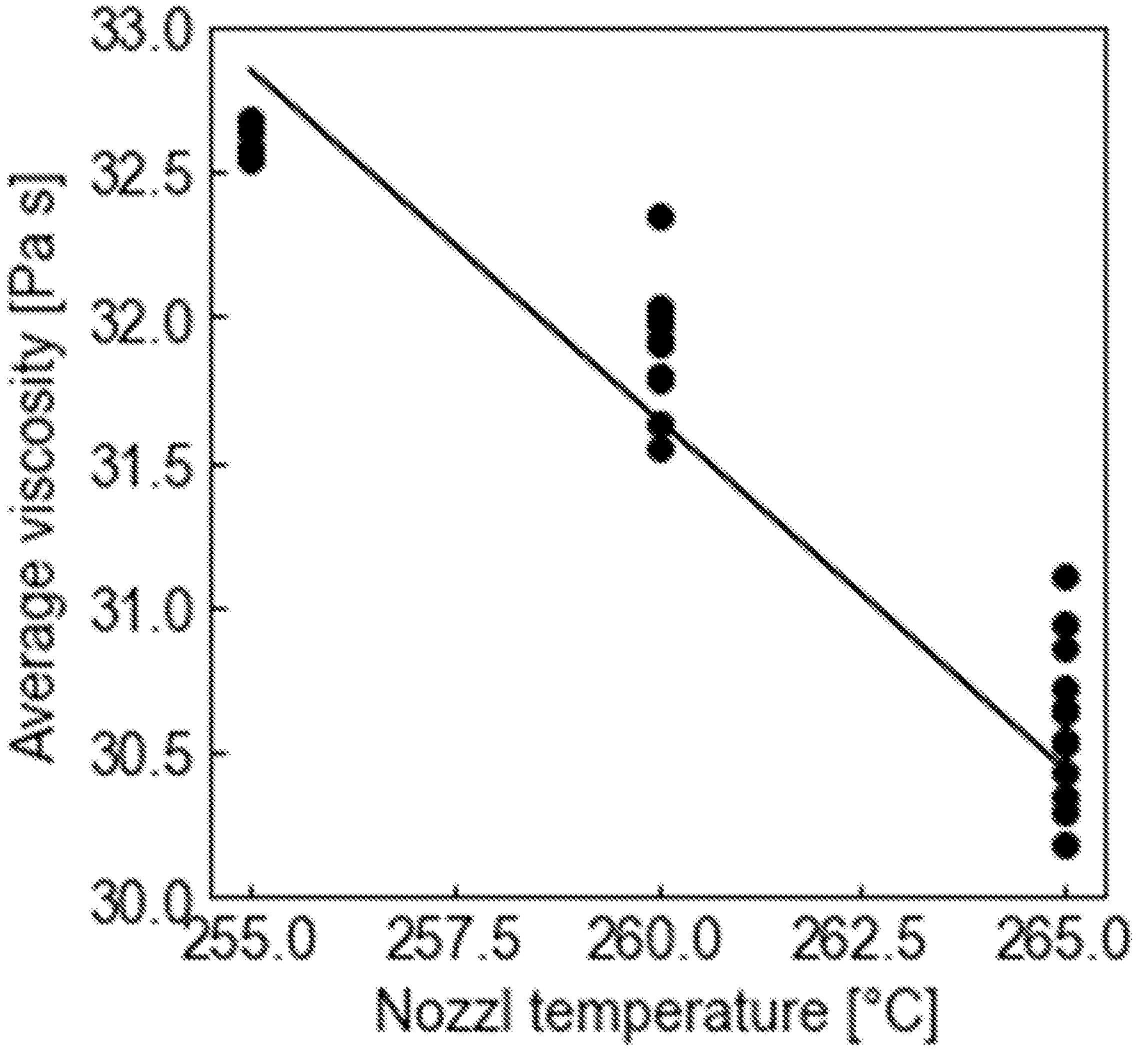
FIG. 8 is a graph illustrating a correlation between a configured value of the resin temperature and an integral value of the runner portion pressure.

Using FIGS. 7 and 8, a result of measurement in the experiment example described with FIG. 6 will be described. FIGS. 7 and 8 illustrate the result of the measurement in the sensor placement portion 73 of the runner when actually measured values of the physical quantity were acquired using the sensor 606 in the mold.

In the present experiment, the time variation of the pressure in the sensor placement portion 73 of the runner and the integral value of the pressure were acquired. Each output value when an input value of the resin temperature was varied was acquired.

FIG. 7 illustrates time-series data from the pressure sensor when the input value of the resin temperature was varied. As illustrated in FIG. 7, the pressure in the injection step was lower as the configured value of the resin temperature was higher.

FIG. 8 illustrates a value variation of the integral value of the pressure when the input value of the resin temperature was varied. Points represent actual measurement data, while a line represents a regression line resulting from linear regression.

As illustrated in FIG. 8, as the configured value of the resin temperature was higher, the integral value of the pressure was smaller. In addition, the linear regression allowed the actual measurement data to be excellently fit. As a result, it was successfully confirmed that the fluidity of the resin was predictable with respect to a configured value of an optional temperature.

Likewise, by acquiring the integral value of the pressure with respect to the configured value of the resin temperature in each of a plurality of the materials and performing fitting using an optional regression model, it is possible to predict a configured value of the resin temperature at which the fluidity matches when the material was changed.

A description will be given of a location (hereinafter referred to as the measurement location) in the mold at which the physical quantity is to be measured. It is preferable that, in any mold structure, the measurement location includes a sprue portion or the runner portion extending at least from the resin inlet port in the mold to the inside of a cavity.

It may also be possible to set the measurement location in the cavity but, when the molding machine specific information is to be derived according to the procedure described above, it is necessary to consider a pressure loss from the resin inlet port to the cavity. Accordingly, analysis accuracy from the resin inlet port to the inside of the cavity needs to be guaranteed.

In the case of providing the sensor in the cavity and performing measurement, a mark resulting from a sensor shape may possibly be left in a molded product. This results in the limitation that the sensor cannot be introduced into a place where appearance quality is required.

Accordingly, in this embodiment, the sprue portion or the runner portion which is close to the resin inlet port and of which the appearance quality is not required is used as the measurement location to allow the molding machine specific information to be simply and accurately determined.

Besides the sprue portion and the runner portion, a location at which a characteristic flow may be observed such as, e.g., a portion immediately below a gate in the cavity, a resin junction portion (weld portion), or a flow end portion may also be used as the measurement location. In this case, the molding machine specific information can more accurately be determined from the physical quantities obtained from a plurality of the sensors.

For example, since a flow rate of a molten resin can be determined from a time point at which a flow front passes through each of a plurality of the measurement locations, the molding machine specific information about a speed of the molten resin can be derived. By additionally measuring the pressure and the temperature at this time, it is also possible to estimate a viscosity of the molten resin in the mold.

Note that, depending on the mold structure and the physical quantity to be measured, an appropriate measurement location varies. For physical quantities other than the mold opening amount, in any mold structure, the sprue portion is preferably used as the measurement location if possible. Note that, in the present description, the wording "preferably" is used only in the sense that some advantageous effects can be expected, and does not mean that the configuration is indispensable.

In the case where it is difficult to provide the sensor in the sprue portion, the sensor only needs to be placed in the runner portion. In the case of a direct gate, the runner portion is not present, and therefore a location in the cavity as close as possible to the gate is selected as the measurement location.

In each of a side gate, a jump gate, a submarine gate, and a banana gate, the sensor is placed in the runner portion immediately below the sprue portion, the runner portion immediately before the gate, or the like. In the case of a pin gate, a 3-plate structure is provided, and accordingly a devised sensor layout is necessary, and the sensor is placed in the runner portion immediately below the sprue portion or the like. In the case of the pin gate, a dummy runner unconnected to the cavity may also be provided for measurement and used as the measurement location. By providing a location dedicated to the measurement, flexibility of mold design is improved. In the case of a film gate or a fan gate, the sensor is placed in the runner portion ahead of an inlet to a gate portion.

A description will be given of parameters each to be measured as the physical quantity described above. In this embodiment, to derive the corrected molding condition, at least the pressure is measured. Alternatively, as described previously, it is also possible to measure the temperature and more accurately measure the viscosity. For the measurement of the pressure and the temperature, it is possible to use, e.g., a mold inner pressure sensor, a mold surface temperature sensor, a resin temperature sensor, or the like. As the resin temperature sensor, either or both of a contact-type temperature sensor such as a thermocouple and a non-contact-type temperature sensor such as an infrared thermometer can be used. For either of the physical quantities of the pressure and the temperature, a time variation during the injection molding processes is recorded.

The injection molding system 1 may also acquire, in addition to the mold opening amount, the temperature, and the pressure, a flow front speed or a flow front passage time point. From a sensor that detects a speed of a flow front and passage of the flow front, information not on the time variation during the injection molding processes, but on the flow front passage time point can be obtained. In the case of acquiring the flow front passage time point, at least two or more sensors are provided, and resin passage time points at two points are compared to each other. By detecting the speed of the flow front and the passage time point, it is possible to more precisely evaluate the injection speed.

A description will be given of the feature values of the physical quantities described above. In derivation of the corrected molding condition in this embodiment, it is possible to use, e.g., the maximum value and integral value of the pressure and a maximum value of the temperature. It is also effective to acquire a maximum value of a time-derivative value with respect to a time variation of the pressure. This feature value is correlated with an instantaneous viscosity of the material. It may also be possible to separately calculate the integral value of the pressure in each of the injection step and a pressure holding step. The integral value of the pressure in the injection step is correlated with an average viscosity of the material in the injection step.

In the case of using the resin temperature sensor of an infrared radiation type, it may also be possible to acquire the maximum value of the time-derivative value with respect to an output value of the time variation from the temperature sensor in the injection step. This feature value is correlated with the flow front speed of the molten resin. In the case of measuring the flow front speed, the flow front speed is used directly as a feature value correlated with a flow speed. In the case of acquiring the flow front passage time point, the flow speed is calculated from the passage time points at the two points and used as the feature value. By recording a relationship of the flow speed to the configured value of the injection speed, the injection speed can more precisely be corrected.

In addition, the feature value of the calculated physical quantity is preferably stored as including also a dimension of variation thereof. For example, in FIG. 8, actually measured values have variation with respect to the regression model. This variation includes information not only on variation specific to the injection molding machine, but also on variation specific to the material.

For example, a market-collected recycled material derived from waste plastic undergoes a plurality of degradations such as thermal degradation during molding, degradation during use, foreign matter contamination during collection/sorting, and thermal degradation during re-pelleting before being re-pelleted. Degrees of the degradations vary depending on a collected waste material, and consequently the market-collected recycled material has larger material specific variation than that of a virgin material.

Accordingly, even when it is determined by the regression model that the fluidity after a material change may match, there is a concern that a defect resulting from variation of the material fluidity may occur during mass production. Therefore, by acquiring information on the material specific variation in advance and presenting the information to the user, the user is allowed to determine whether or not the fluidity variation is appropriate with respect to performance required of the manufactured product. Alternatively, by reviewing the product design in response to the fluidity variation and reducing the required performance, it is possible to make full use of the recycled material. This can enable material selection and design considering a production yield during mass production and support the utilization of the recycled material.

According to this embodiment thus configured, in the case of using a mold having a production result using a certain material to mold another material, it is possible to obtain, on the basis of each of the production result that allows a non-defective product to be obtained and the material information acquired in advance, it is possible to obtain the at least one candidate material that allows a non-defective product to be obtained and an appropriate molding condition when the candidate material is used. For example, by suggesting, to a user who intends to change a current material because of high price, but has difficulty in considering the use of an appropriate substitute material, a less expensive candidate substitute material having a matchable fluidity and the corrected molding condition therefor, it is possible to achieve lower cost, while significantly reducing man-hours resulting from a material change. Likewise, it is possible to promote the utilization of the recycled material.

Additionally, according to this embodiment, even when there is no production result using the mold, it is possible to suggest a novel material on the basis of each of the material information acquired in advance and the property required of the manufactured product.

Moreover, in this embodiment, by sharing the material specific information acquired by a large number of users, as the users increase, there are more cases where the corrected molding condition can be acquired by utilizing the material specific information acquired by other users, and therefore it is possible to significantly reduce the man-hours required to acquire the material specific information.

Second Embodiment

Figure 9:
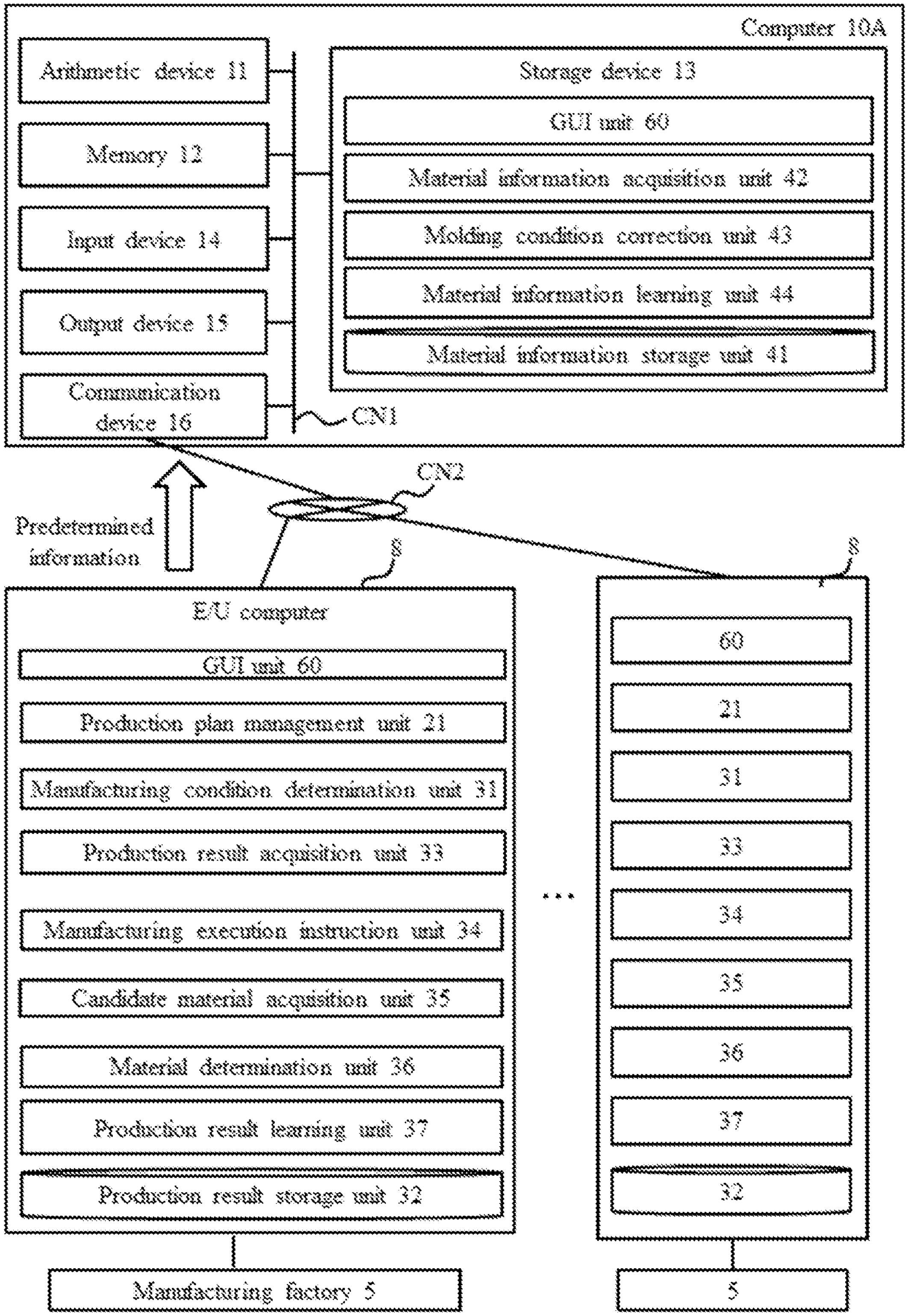
FIG. 9 is an illustrative view illustrating a configuration of a computer of an injection molding system according to a second embodiment.

Using FIG. 9, a second embodiment will be described. In each of the following embodiments including this embodiment, differences from the first embodiment will be mainly described. In this embodiment, the material suggestion system 4 of the injection molding system 1 is provided in a computer 10A on the network CN2, and the production management system 2 and the manufacturing execution system 3 are managed by a computer 8 on the user (E/U) side having the manufacturing factory 5.

The factory-side computer 8 transmits the predetermined information to the computer 10A mounted in the molding condition correction system 4 to be able to obtain the candidate materials and the corrected molding condition. As described above, in the suggestion of the substitute material, examples of the predetermined information include information on the mold determined by the manufacturing condition determination unit 31, the material (hereinafter referred to as the predetermined material) having the production result in combination with the determined mold, and the production result (first production result) using the combination of the determined mold and the predetermined material. Alternatively, in the suggestion of the novel material, the predetermined information includes the information on the mold determined by the manufacturing condition determination unit 31, the product quality required of the molded product, and the property required of the material. The information on the mold includes the runner structure, the volume of the molded product, the shape of the molded product, and the like.

This embodiment thus configured also achieves the same operation and effect as those achieved by the first embodiment. In addition, according to this embodiment, the computers 8 of a plurality of the users can share the material suggestion system 4 provided by the computer 10A. Therefore, in this embodiment, it is possible to allow the one material suggestion system 4 to provide a plurality of the factories with the candidate material and the corrected molding condition.

Third Embodiment

Figure 10:
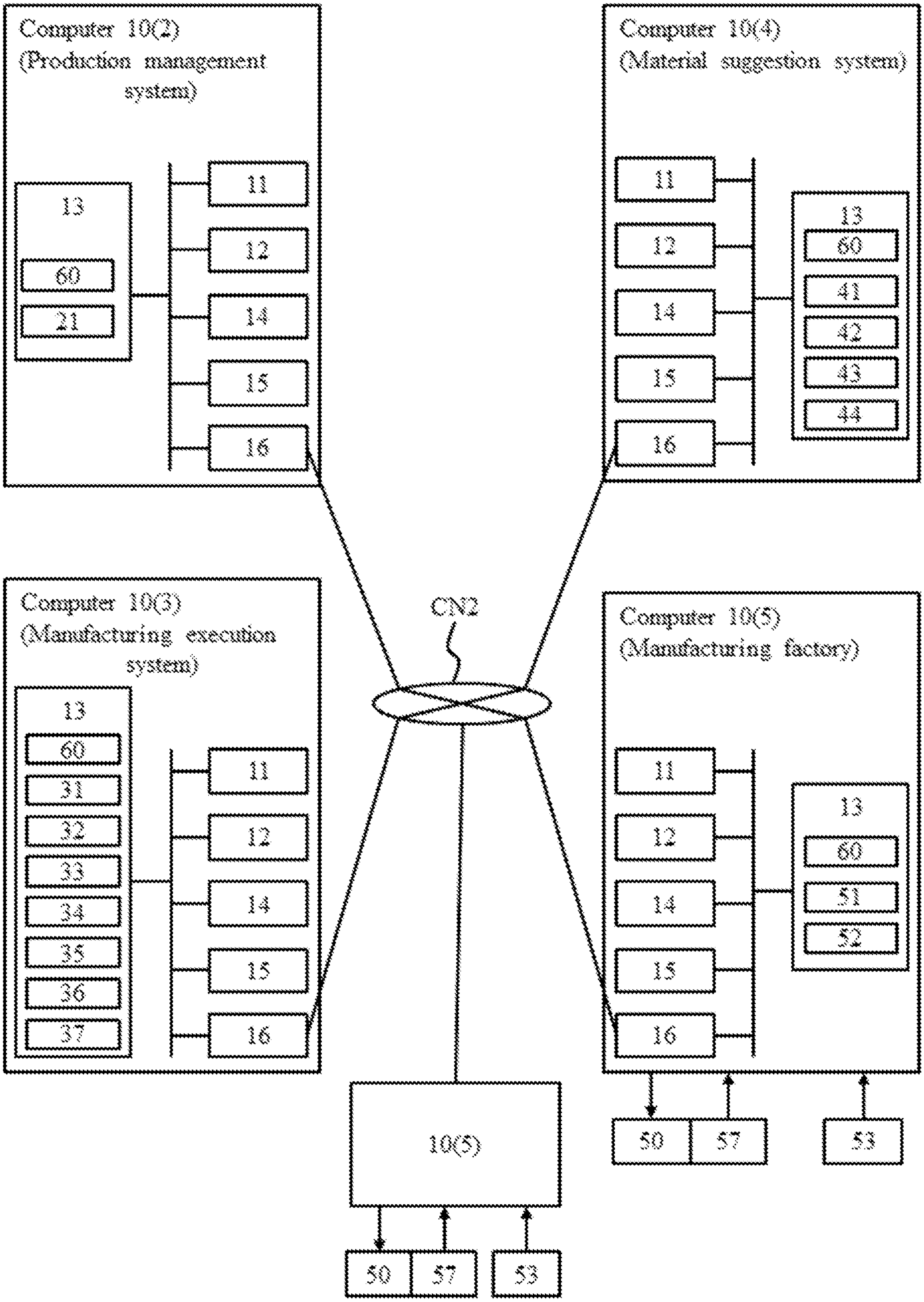
FIG. 10 is an illustrative view illustrating a configuration of the computer of the injection molding system according to a third embodiment.

Using FIG. 10, a third embodiment will be described. In this embodiment, the production management system 2, the manufacturing execution system 3, the material suggestion system 4, and the manufacturing factory 5 each described with FIG. 1 are implemented by computers 10(2), 10(3), 10(4), and 10(5) and coupled by the communication network CN2.

This embodiment thus configured also achieves the same operation and effect as those achieved by the first embodiment. In addition, in this embodiment, the computers 10(2) to (5) are allocated individually to the systems 2 to 5, and therefore, for example, the computers 10(5) of a plurality of the dispersed manufacturing factories can also be managed using the shared production management system 2, the shared manufacturing execution system 3, and the shared material suggestion system 4.

Note that all the features described with reference to the injection molding system can also be described as features of the molding condition correction system.

This invention is not limited to the foregoing embodiments, and includes various modifications. For example, the foregoing embodiments have been set forth in detail to describe this invention in an easily understandable manner, and this invention is not necessarily limited to embodiments having all of the described configurations. A part of the configuration of a certain one of the embodiments may be replaced with the configuration of another of the embodiments, or the configuration of the other embodiment can also be added to the configuration of the certain embodiment. A part of the configuration of each of the embodiments may be added to, deleted from, or replaced with another configuration. In addition, a combination of the features disclosed in this embodiment is not limited to the description of the scope of claims.

REFERENCE SIGNS LIST

1 Injection molding system
2 Production management system
3 Manufacturing execution system
4 Material suggestion system
5 Manufacturing factory
31 Manufacturing condition determination unit
32 Production result storage unit
33 Production result acquisition unit
34 Manufacturing execution instruction unit
35 Candidate material acquisition unit
36 Material determination unit
37 Production result learning unit
41 Material information storage unit
42 Material information acquisition unit
43 Molding condition correction unit
44 Material information learning unit
51 Manufacturing execution unit
52 Molding condition creation unit
53 Quality inspection unit
57 Sensor

The invention claimed is:

1. An injection molding support system configured to include one or more computers each including a processor and a storage device, the processor being configured to perform processes of:

acquiring a production result using a combination of a mold and a predetermined material and material information of the predetermined material, wherein the material information includes fluidity determined from physical quantities measured by sensors mounted in advance in injection molding machines and molds, the sensors measuring the physical quantities at predetermined positions;

acquiring, from the storage device, the production result, the material information of the predetermined material, and material information of a plurality of materials acquired in advance, and selecting, on a basis of the acquired information, at least one candidate material from among the plurality of materials;

creating a corrected molding condition for performing injection molding by using a combination of the selected candidate material and the mold, wherein the processor uses the sensor measurements to calculate specific flow properties including at least one of a pressure integral value from an injection start to a peak pressure and a maximum derivative value of pressure, and automatically adjusts specific injection molding parameters including at least one of cylinder temperature, injection speed, back pressure, and screw rotation to achieve equal fluidity at a resin inlet port of the mold, wherein the corrected molding condition is created such that a physical quantity of molten resin in the resin inlet port of the mold is equal between different materials to ensure identical molded product quality, wherein the processor compares fluidity characteristics of the predetermined material with fluidity characteristics of the candidate material using a regression model derived from the material information, wherein the regression model is obtained by fitting actual measurement data of the pressure integral value acquired at a plurality of configured values of resin temperature for each of the predetermined material and the candidate material, and the processor uses the regression model to predict a configured value of the resin temperature at which the fluidity of the candidate material matches the fluidity of the predetermined material, and calculates the corrected molding condition by determining parameter adjustments that compensate for differences in the fluidity characteristics to achieve matching physical quantities at the resin inlet port; and providing a user with the created corrected molding condition and the selected candidate material, wherein the processor controls the injection molding machine to execute the injection molding process using the corrected molding condition to produce a molded product having the identical molded product quality as products produced using the predetermined material.

2. The injection molding support system according to claim 1, wherein the material information includes:

information in which an actual measured value of a physical quantity at a predetermined location in an injection molding machine or at a predetermined location in a mold attached to the injection molding machine when an optional molding condition is inputted to the injection molding machine to cause the injection molding machine to perform injection molding is associated with the optional molding condition; and a recommended molding condition for the material.

3. The injection molding support system according to claim 2, wherein the physical quantity includes at least any one of a temperature, a speed, and a pressure, and wherein the temperature, the speed, or the pressure is used to derive a feature value correlated with a viscosity of the material, and wherein the feature value is used in the regression model to compare fluidity characteristics between the predetermined material and the candidate material.

4. The injection molding support system according to claim 2, wherein the physical quantity includes a flow property calculated from any one or more of a pressure integral value from an injection start to a peak pressure, a pressure integral value from the injection start to mold opening, and a maximum derivative value of the pressure.

5. The injection molding support system according to claim 2, wherein the selected candidate material is a material having a matching flow property within a range of the recommended molding condition for the material.

6. The injection molding support system according to claim 4, wherein the material information includes a variation of the flow property when the flow property is acquired in advance and a variation of a product quality of an obtained molded product.

7. The injection molding support system according to claim 6, wherein, in the inputting the production result using a combination of the injection molding machine, the mold, and the predetermined material, and predetermined material information acquired in advance for the predetermined material, an accuracy required of a manufactured product is input in conjunction, and the variation of the flow property of the selected candidate material acquired in advance and the product quality of the obtained molded product satisfy the accuracy required of the manufactured product.

8. The injection molding support system according to claim 1, wherein the predetermined material is a virgin material, and the candidate material is a recycled material, wherein the recycled material has larger material specific variation than the virgin material due to degradations undergone before being re-pelleted, and wherein the processor acquires information on the material specific variation of the recycled material in advance and uses the regression model to determine whether the fluidity of the recycled material after a material change matches the fluidity of the virgin material to allow a non-defective product to be obtained.

9. An injection molding support method that uses a computer to support injection molding, the computer performing processes of:

acquiring a production result using a combination of a mold and a predetermined material and material information of the predetermined material, wherein the material information includes fluidity determined from physical quantities measured by sensors mounted in advance in injection molding machines and molds, the sensors measuring the physical quantities at predetermined positions;

selecting, on a basis of each of the production result, the material information of the predetermined material, and material information of a plurality of materials acquired in advance, at least one candidate material from among the plurality of materials;

creating a corrected molding condition for performing injection molding by using a combination of the selected candidate material and the mold, wherein the computer uses the sensor measurements to calculate specific flow properties including at least one of a pressure integral value from an injection start to a peak pressure and a maximum derivative value of pressure, and automatically adjusts specific injection molding parameters including at least one of cylinder temperature, injection speed, back pressure, and screw rotation to achieve equal fluidity at a resin inlet port of the mold, wherein the corrected molding condition is created such that a physical quantity of molten resin in the resin inlet port of the mold is equal between different materials to ensure identical molded product quality, wherein the computer compares fluidity characteristics of the predetermined material with fluidity characteristics of the candidate material using a regression model derived from the material information, wherein the regression model is obtained by fitting actual measurement data of the pressure integral value acquired at a plurality of configured values of resin temperature for each of the predetermined material and the candidate material, and the computer uses the regression model to predict a configured value of the resin temperature at which the fluidity of the candidate material matches the fluidity of the predetermined material, and calculates the corrected molding condition by determining parameter adjustments that compensate for differences in the fluidity characteristics to achieve matching physical quantities at the resin inlet port; and providing a user with the created corrected molding condition and the selected candidate material, wherein the computer controls the injection molding machine to execute the injection molding process using the corrected molding condition to produce a molded product having the identical molded product quality as products produced using the predetermined material.

10. The injection molding support method according to claim 9, wherein the material information includes:

information in which an actual measured value of a physical quantity at a predetermined location in an injection molding machine or at a predetermined location in a mold attached to the injection molding machine when an optional molding condition is inputted to the injection molding machine to cause the injection molding machine to perform injection molding is associated with the optional molding condition; and a recommended molding condition for the material.

11. The injection molding support system according to claim 1, wherein the processor is further configured to:

control a plasticization motor to retract a screw and feed resin pellets from a hopper into a cylinder;

heat the resin pellets with heaters and rotate the screw to plasticize the resin into an evenly molten state; and adjust a back pressure and number of rotations of the screw to control a density of the molten resin and a degree of rupture of reinforced fiber, wherein these variations affect the molded product quality.

12. The injection molding support system according to claim 1, wherein the processor is further configured to:

control an injection motor to advance a screw to inject the molten resin into a mold via a nozzle;

wherein the molten resin injected into the mold receives both a cooling effect from a wall surface of the mold and a heating effect from shear heating resulting from flow as the molten resin flows toward an inside of a cavity of the mold.

13. The injection molding support system according to claim 1, wherein the processor is further configured to:

after the mold is filled with the molten resin, feed additional molten resin into the mold by holding pressure to compensate for volume shrinkage caused by cooling of the molten resin;

control a mold clamping force that closes the mold relative to pressure during injection and pressure during pressure holding to prevent slight mold opening after solidification of the molten resin that would affect molded product quality.

14. The injection molding support system according to claim 1, wherein the processor is further configured to:

determine that a candidate recycled material is derived from waste plastic that has undergone multiple degradations including thermal degradation during molding, degradation during use, foreign matter contamination during collection/sorting, and thermal degradation during re-pelleting before being re-pelleted;

acquire information on material-specific variation in advance and present the information to the user to allow determination of whether fluidity variation is appropriate with respect to performance required of a manufactured product; and enable review of product design in response to the fluidity variation and reduction of required performance to maximize utilization of the recycled material while considering production yield during mass production.

15. The injection molding support system according to claim 1, wherein:

the material information is shared among a plurality of users through a cloud server;

as a number of users increases, the system provides more cases where corrected molding conditions can be acquired by utilizing material-specific information acquired by other users; and the sharing of material-specific information among multiple users significantly reduces man-hours required to acquire the material-specific information.

16. The injection molding support system according to claim 1, wherein the processor is further configured to:

evaluate molded product quality based on size, amount of warp, burr, scratch, glow, and color, wherein a product quality inspection of the molded product is performed automatically, wherein the corrected molding condition includes adjusting at least one of the injection speed, injection pressure, or resin temperature based on a comparison of viscosity characteristics between the predetermined material and the candidate material, and wherein the adjustment is calculated to achieve equal pressure integral values at the resin inlet port during filling.

17. The injection molding support system according to claim 1, wherein the sensors are placed in at least one of a sprue portion and a runner portion extending from a resin inlet port in the mold, wherein the sprue portion or the runner portion is used as a measurement location to determine the physical quantities without affecting appearance quality of a molded product.

18. The injection molding support system according to claim 1, wherein the processor calculates the pressure integral value from the injection start to the peak pressure as a feature value correlated with an average viscosity of the material in an injection step, and wherein the processor uses the feature value to quantitatively evaluate the fluidity of the material for creating the corrected molding condition.

19. The injection molding support system according to claim 1, wherein the processor corrects the molding condition to account for differences in injection mechanism configurations between injection molding machines, the injection mechanism configurations including at least one of a shape of a screw, a shape of a cylinder, a shape of a nozzle, and a layout of heaters, wherein the correction ensures that the physical quantity of the molten resin in the resin inlet port of the mold is equal regardless of which injection molding machine is used.

20. The injection molding support system according to claim 1, wherein the regression model is derived by performing linear regression on actual measurement data of the pressure integral value acquired at a plurality of configured values of resin temperature, and wherein the processor uses the regression model to predict a configured value of the resin temperature at which the fluidity of the candidate material matches the fluidity of the predetermined material.

* * * * *